United States Patent
Wei et al.

(10) Patent No.: US 11,671,904 B1
(45) Date of Patent: Jun. 6, 2023

(54) ESTABLISHING COMMUNICATION LINKS TO ASSIST HEADLESS DEVICES

(71) Applicant: Amazon Technologies, Inc., Seattle, WA (US)

(72) Inventors: QingYun Wei, San Jose, CA (US); Zhao Lou, Redwood City, CA (US); Shao-Cheng Wang, Santa Clara, CA (US); Avinash Joshi, San Jose, CA (US); Xi Chen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 17/020,129

(22) Filed: Sep. 14, 2020

Related U.S. Application Data

(63) Continuation-in-part of application No. 16/884,992, filed on May 27, 2020.

(51) Int. Cl.
| | |
|---|---|
| *H04W 48/14* | (2009.01) |
| *H04L 67/02* | (2022.01) |
| *H04L 67/56* | (2022.01) |
| *H04W 4/80* | (2018.01) |
| *H04W 12/06* | (2021.01) |
| *H04W 76/12* | (2018.01) |

(Continued)

(52) U.S. Cl.
CPC ............. *H04W 48/14* (2013.01); *H04L 67/02* (2013.01); *H04L 67/56* (2022.05); *H04W 4/80* (2018.02); *H04W 12/06* (2013.01); *H04W 76/12* (2018.02); *H04W 76/15* (2018.02); *H04W 84/12* (2013.01)

(58) Field of Classification Search
CPC ....... H04W 48/14; H04W 4/80; H04W 12/06; H04W 76/12; H04W 76/15; H04W 84/12; H04L 67/02
See application file for complete search history.

(56) References Cited

U.S. PATENT DOCUMENTS 9,591,451 B1 * 3/2017 Knight .............. H04M 1/72412
9,609,067 B2    3/2017 Mobarak et al.
(Continued)

OTHER PUBLICATIONS

Office Action for U.S. Appl. No. 16/884,992, dated Nov. 26, 2021, Lou, "Establishing Data Channels Between User Devices and Remote Systems", 18 pages.
(Continued)

*Primary Examiner* — Asghar H Bilgrami
(74) *Attorney, Agent, or Firm* — Lee & Hayes, P.C.

(57) ABSTRACT

Techniques for establishing connections between user devices and headless devices attempting to connect to networks. A headless device may attempt to connect to an access point that requires interaction with a captive portal webpage for access to a network. However, the headless device my lack a display to present the captive portal webpage. The headless device may establish a connection with a user device using a PAN protocol. The headless device may then receive the captive portal webpage received from the access point, and relay the webpage to the user device using the PAN protocol. A user may use the user device to interact with the captive portal webpage, and the user device may then relay interaction data back to the headless device using the PAN protocol. The headless device may then provide that interaction data to the access point to be provided access to the network.

20 Claims, 18 Drawing Sheets

(51) Int. Cl.
   *H04W 76/15* (2018.01)
   *H04W 84/12* (2009.01)

(56) References Cited

U.S. PATENT DOCUMENTS

| | | | |
|---|---|---|---|
| 10,216,935 B2* | 2/2019 | Abene | H04W 4/80 |
| 2014/0351446 A1* | 11/2014 | Cho | H04W 4/80 |
| | | | 709/227 |
| 2015/0102960 A1* | 4/2015 | Asrani | G01S 5/0072 |
| | | | 342/357.42 |
| 2016/0374133 A1* | 12/2016 | Logue | H04W 76/14 |
| 2017/0171747 A1* | 6/2017 | Britt | H04W 12/0431 |
| 2017/0245285 A1* | 8/2017 | Palin | H04W 72/082 |
| 2018/0212826 A1* | 7/2018 | Klausen | H04L 41/0816 |
| 2019/0246353 A1* | 8/2019 | Jensen | H04L 67/12 |
| 2019/0346417 A1* | 11/2019 | Benefield | F24F 11/58 |
| 2021/0256833 A1* | 8/2021 | Daoura | H04W 52/0216 |
| 2021/0365445 A1* | 11/2021 | Robell | G06F 16/90 |

OTHER PUBLICATIONS

Office Action for U.S. Appl. No. 16/884,992, dated Feb. 11, 2022, Lou, "Establishing Data Channels Between User Devices and Remote Systems", 18 Pages.

Office Action for U.S. Appl. No. 16/884,992, dated May 12, 2022, Lou, "Establishing Data Channels Between User Devices and Remote Systems", 20 pages.

* cited by examiner

US 11,671,904 B1

ESTABLISHING COMMUNICATION LINKS TO ASSIST HEADLESS DEVICES

RELATED APPLICATIONS

This application claims priority to and is a continuation-in-part of U.S. patent application Ser. No. 16/884,992, filed on May 27, 2020, the entire contents of which are incorporated herein by reference.

BACKGROUND

As the capabilities of computing devices continue to evolve, the techniques used to interact with computing devices continue to become more sophisticated. For instance, computing devices designed for user consumption (or "user devices") are able to connect to various types of networks using various communication protocols, and are capable of performing an increasing number of activities for users (e.g., streaming music, controlling appliances or other devices, communicating with users, facilitating phone calls, etc.). As user devices continue to increase in complexity, as do the operations required to configure and troubleshoot these user devices for use. Accordingly, even tech-savvy users may have difficulties configuring or troubleshooting user devices for their use.

To help users resolve any device-related issues, device manufacturers and retailers often provide customer support services via remote communication systems. Traditionally, the customer support services have relied heavily on user phone calls to collect information and help the user perform troubleshooting operations to help resolve the device-related issues. However, these phone calls can be lengthy and frustrating experiences for users, and a waste of resources of the remote communication systems. Rather than using phone calls to troubleshoot device-related issues experienced by users, it may be advantageous for a remote communication system to connect directly to the user device to troubleshoot the user device that is experiencing issues. However, depending on the issues that these user devices are experiencing, it may be difficult or impossible for the remote communication systems to connect to the user devices to troubleshoot the device-related issues. Accordingly, remote communication systems are limited in their ability to connect to user devices in order to configure the user device and/or troubleshoot device-related issues.

While connecting to networks may be straightforward for certain types of user devices, some types of user devices may have difficulties connecting to networks in order to troubleshoot the device-related issues. For example, to connect to networks, such as wireless local area networks (WLANs), user devices often have to know the network name (e.g., service set identifier (SSID)) as well as a password (or another credential) to access a private WLAN. Even further, some networks require users of user devices to interact with webpages, such as captive portals, before full access is granted to a network. As noted above, this may be straightforward for devices that have displays and traditional input mechanisms (e.g., keyboard, mouse, touch screen, etc.). However, many user devices do not have monitors or displays and input mechanisms (such as mouse, keyboard, etc.) for users to input network credentials and/or interact with captive portals. Such a device is usually referred to as a "headless device." Thus, a user of a headless device may be unable to connect the headless device to networks that require interactions with a captive portal to enter network credential information.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1A:
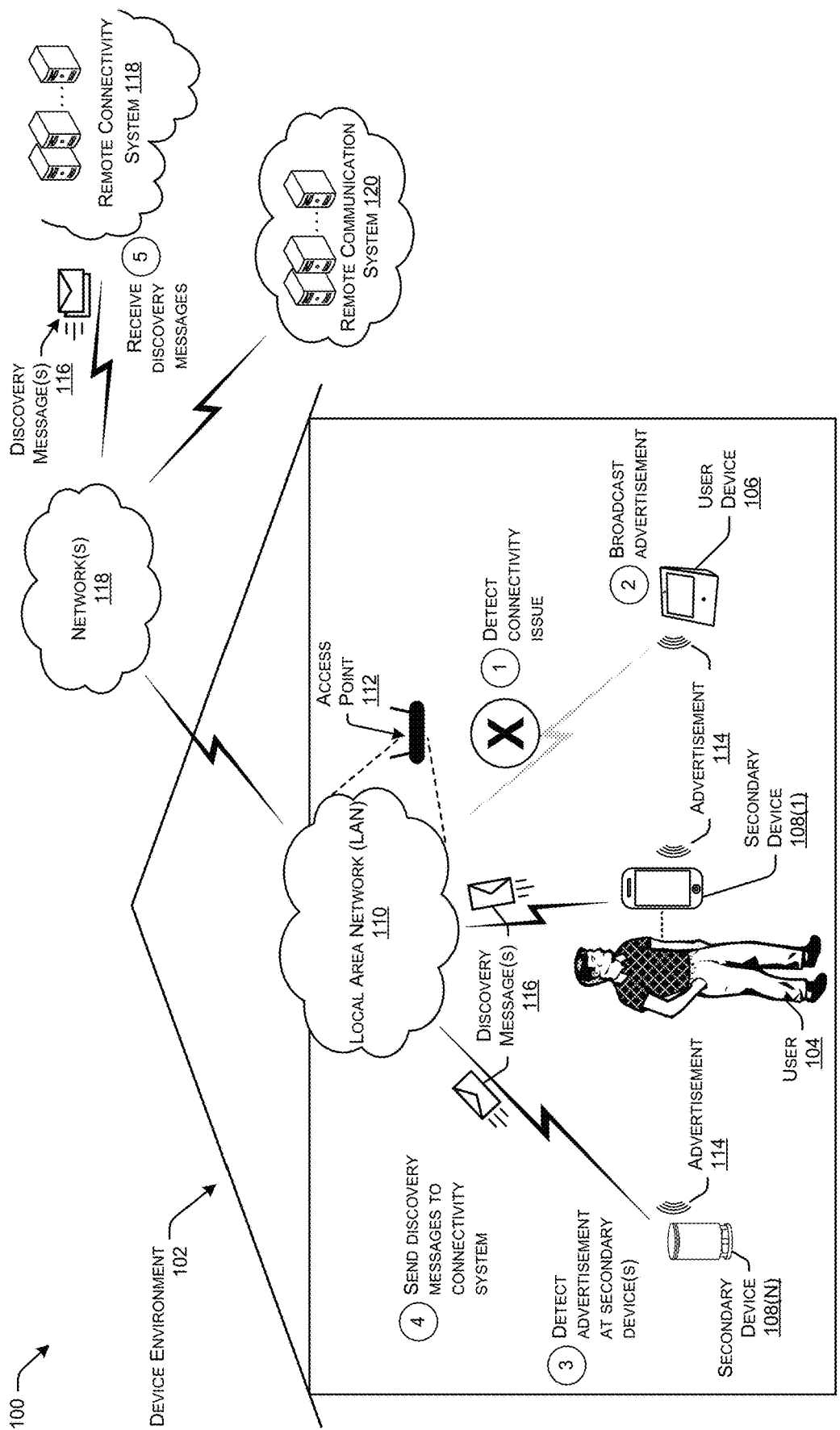
FIG. 1A illustrates an example environment in which a user device detects connectivity issues with a local area network (LAN), broadcasts an advertisement using a personal area networking (PAN) protocol to secondary devices. The secondary devices that detect the advertisement send discovery messages to a remote connectivity system indicating they detected the advertisement from the user device that is experiencing connectivity issues.

This disclosure describes, at least in part, techniques for establishing communication channels between user devices experiencing network connectivity issues and remote communication systems. The techniques described herein include the use of a secondary device to act as a proxy, or a "middle man," to facilitate the communication of data between the user device and the remote communication system. For instance, a user device may determine that it is unable to connect to a network (e.g., a wireless local area network (WLAN)), and begin broadcasting, using a personal area networking (PAN) protocol, advertisement messages that indicate the user device is unable to connect to the network. A secondary device in (or near) an environment of the user device may detect the advertisement message, and send a discovery message to a remote connectivity system indicating that it detected the advertisement message of the user device. The remote connectivity system stores this information, and can further provide this information to the remote communication system that is attempting to troubleshoot the user device experiencing the lack of connectivity. The remote communication system can establish a connection with the secondary device, and instruct the secondary device to establish a connection with the user device using the PAN protocol. In this way, the remote communication system may establish a communication channel with the user device, using the secondary device as a proxy, to remotely troubleshoot the user device by causing the user device to perform remedial actions.

According to the techniques described herein, a user device may be configured to connect to one or more networks, such as a WLAN and ultimately an Internet, and perform actions on behalf of users (e.g., streaming music and videos, purchasing items, controlling other devices and appliances, searching the Internet, and so forth). However, the user devices may experience connectivity issues to the WLAN (such as an IEEE 802.11 WLAN, commonly called "WiFi"), such as connectivity drops, incorrect credentials or passwords, lack of bandwidth, etc., and may not function properly. According to the techniques described herein, a user device may detect a connectivity issue with connecting to the WLAN, and be configured to start emitting one or more advertisement messages, or beacons, using a PAN protocol (such as Bluetooth Low Energy (BLE)).

The user device may be located in an environment that includes one or more other computing devices, or "secondary devices." These secondary devices may be configured to, periodically or continuously, listen to detect advertisement messages broadcasted from other devices using the PAN protocol. Accordingly, one or more secondary devices located in the environment of the user device may detect the advertisement messages from the user device that indicate the user device is experiencing a lack of network connectivity. The secondary devices may have connectivity to one or more networks. For instance, the secondary devices may be connected to the WLAN, and/or be connected to other networks such as cellular networks. The secondary devices may then each send a discovery message to a remote connectivity system indicating that they discovered the user device in their environment that is experiencing the lack of connectivity.

The remote connectivity system may receive the discovery messages, and store records indicating device identifiers (e.g., device serial numbers (DSNs)) for the user device and the secondary devices that detected the advertisement messages. A remote communication system, which may be the same as, or separate from, the remote connectivity system, may request information about what secondary devices detected the advertisement messages from the user device. The remote communication system may receive device identifiers for at least one of the secondary devices, and establish a connection with one of the secondary devices over one or more networks. For instance, the remote communication system may establish a Transport Control Protocol/Internet Protocol (TCP/IP) connection with the secondary device over the Internet and via the WLAN. The remote communication system may send an instruction to the secondary device to establish a connection with the user device using the PAN protocol. For instance, the secondary device may establish a connection using BLE with the user device. In this way, the remote communication system may communicate IPv6 data packets to the user device using IPv6 over BLE.

In some instances, the remote communication system may establish an end-to-send secure communication channel with the user device, such as a Transport Layer Security (TLS) channel, using the secondary device as a proxy. That is, the secondary device may simply proxy data between the user device and remote communication system to allow for secure communications between the user device and remote communication system.

Thus, the user device and the secondary device may communicate using, as an example, TCP/IPv6 over BLE. For example, Bluetooth Special Interest Group (SIG) has developed Request for Comments (RFC) 7668 to support IPv6 over BLE. The use of IPv6 over BLE adds Low-power Wireless Personal Area Networks (6LoWPAN) on top of the Logical link control and adaptation protocol (L2CAP) protocol layer of the BLE protocol stack. The L2CAP protocol layer simplifier the IP headers, compresses data, and encapsulates the IP data packets to allow them to be sent via BLE. However, this implementation may require that the TCP/IP stack and the 6LowPAN stack be in the kernel space.

According to the techniques described herein, the user device and the secondary devices may include one or more applications in user space of their respective memory that stores various protocol stacks, such as TCP, IP, and 6LoWPAN protocol stacks. For instance, certain types of devices may not grant privilege for applications or software to change the devices' TCP/IP configurations, which are traditionally in the kernel space. Accordingly, by moving the TCP, IP, 6LoWPAN protocol stacks into the user space of the user devices and secondary devices, the devices can redirect any 6LoWPAN input/output to a BLE Generic Attribute Profile (GATT) service and establish an end-to-end tunnel using applications or other software running on the user devices and secondary devices.

The techniques described herein enable remote communication systems to communicate with user devices that are experiencing connectivity issues, and otherwise would not be able to allow for the remote communication system to connect remotely. Using a secondary device that has connectivity as a proxy mechanism, the remote communication system is able to remotely connect to the user device and trouble shoot the user device. For instance, the remote communication system may cause the user device to reboot, export event logs for software running on the user device, and/or perform other operations to remedy the issues causing the lack of network connectivity of the user device. Although some of the techniques described herein are with respect to certain communication protocols, such as WLAN protocols (e.g., 802.11 protocols), PAN protocols (e.g., BLE), other types of communication protocols and/or networks may similarly utilize the techniques described herein.

This disclosure further describes techniques for establishing connections between user devices and headless devices attempting to connect to access points of networks. In some examples, a headless device may be attempting to connect to an access point that requires devices to interact with a captive portal webpage prior to being provided access to a network created by the access point. However, interacting with a captive portal webpage often requires a display and/or other input/output devices that are not included in a headless device. According to the techniques of this disclosure, a headless device may establish a connection with a user device using a PAN protocol, such as BLE. The headless device may then forward data representing the captive portal webpage from the access point, and to the user device, using IPv6 over BLE. The user of the user device may then interact with the captive portal webpage on their user device, which has a display, and the user device may then relay interaction data back to the headless device using IPv6 over BLE. The headless device may then provide that interaction data to the access point in order to be provided access to the network created by the access point. In this way, headless devices that may otherwise be prevented from accessing a network created by an access point that requires interaction with a captive portal are able to connect to the network with assistance from a user device that has a display.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates an example environment 100 in which a user device detects connectivity issues with a local area network (LAN), broadcasts an advertisement using a personal area networking (PAN) protocol to secondary devices. The secondary devices that detect the advertisement send discovery messages to a remote connectivity system indicating they detected the advertisement from the user device that is experiencing connectivity issues.

As illustrated, the example environment 100 may include a device environment 102 that includes a user 104, a user device 106, and one or more secondary devices 108(1)-(N) (where "N" is any integer of 1 or greater). The user device 106 and the secondary device(s) 108 may each comprise any sort of client computing device capable of communicating using one or more communication protocols and/or over one or more networks, such as voice-controlled assistants, tablet computing devices, smart televisions (TVs), laptop computer, desktop computers, mobile phones, display devices, audio devices, gaming devices, and/or the like.

As illustrated, the device environment may further include an access point 112 that provides a local area network (LAN) 110. The LAN 110 may comprise any type of LAN, including any combination of wired and/or wireless LANs (e.g., WLANS), such as campus area networks (CANs), metropolitan area networks (MANs), etc. In some instances, the LAN 110 may comprise a network that follows an IEEE 802.11 standard, or a "WiFi" network.

As illustrated, the user device 106 may, at "1," detect a connectivity issue or problem with connecting to the LAN 110 (e.g., establishing a connection with the access point 112). Generally, the connectivity issue may comprise one or more different types of connectivity issues, such as dropping of connectivity to the LAN 110, incorrect credentials (e.g., password) to connect to the LAN 110, limited (or no) connectivity from an Internet Service Provider (ISP), etc. In some examples, the user 104 may have simply not connected the user device 106 to the LAN 110, which may be a connectivity issue, or indicate a lack of connectivity.

Based on detecting the connectivity issue, the user device 106 may, at "2," broadcast an advertisement 114 in the device environment 102. The advertisement 114 may include an indication of the connectivity issue in the payload. In some examples, the advertisement 114 may comprise a BLE advertisement message, or "beacon," that is transmitted using a radio transmitter and according to the BLE protocol. The user device 106 may send a single advertisement 114, or continuously/periodically send advertisements 114 into the device environment using a PAN protocol, such as BLE. The advertisement(s) 114 may include various types of data and/or metadata. For instance, the advertisement 114 may indicate that the user device 106 is unable to connect to a network (e.g., LAN 110, network(s) 118, an Internet, etc.), and/or that the user device 106 is experiencing lack of connectivity issues such as low bandwidth, dropping of connections, incorrect credentials, etc. In some instances, the advertisement 114 may further include metadata that indicates a cause, or root cause, for the connectivity issue. For instance, the advertisement 114 may indicate that the connectivity issue is caused by low bandwidth from an ISP, drops with the access point 112, incorrect password for the LAN 110, software program(s) crashing, etc.

The secondary devices 108 (single or multiple secondary devices 108) may be configured to continuously, or periodically, listen for advertisements 114 that are broadcasted from other devices, such as the user device 106. Accordingly, one or more secondary devices 108 may detect the advertisement 114 emitted by the user device 106 at "3." In addition to detecting the advertisement 114, the secondary devices 108 may each calculate or determine a received signal strength indicator (RSSI) for the advertisement 114 received at each of the secondary devices 108. As an example, if the user device 106 broadcasts the advertisement 114 at a relatively high power for BLE (e.g., +4 dBm), a secondary device 108 that is within a few inches of the user device 106 may calculate an RSSI value of −26, and a secondary device 108 that is a few feet away may calculate an RSSI of −50 for the advertisement 114.

The secondary devices 108 that detected the advertisement 114 may, at "4," generate and send discovery messages 116 to a remote connectivity system 118. For instance, the secondary device 108 may have connectivity to the LAN 110 and transmit the discovery messages 116 via the LAN 110 and over one or more networks 118 (e.g., the Internet). In some examples, the secondary devices 108 may have connectivity via another network 118, such as cellular networks. The discovery messages 116 may indicate that the secondary devices 108 heard the advertisement 114 sent from the user device 106. The discovery messages 116 may further include a device identifier for the user device 106 (e.g., a device serial number (DSN)). Further, the discovery messages 116 may each include a device identifier (DSN) for the secondary device 108, and may potentially include the RSSI for the advertisement 114 detected at, and calculated by, the respective secondary device 108. In some instances, the discovery messages 116 may further include metadata identified from the advertisement 114 that indicates the cause or root cause of the connectivity issue that the user device 106 is experiencing.

At "5," the remote connectivity system 118 may receive the discovery message(s) 116 sent from the one or more secondary devices 108 over the network(s) 118. Generally, the remote connectivity system 118 and the remote communication system 120 may be at least partially responsible for orchestrating the remote connection between the user device 106 and the remote communication system 120 through the secondary device 108.

As illustrated, the remote connectivity system 118 and the remote communication system 120 may be hosted by one or more network-accessible resources. While illustrated as being collocated, it is to be appreciated that these resources may be located across different regions and/or across the globe. Further, the network(s) 118 which connects to the remote connectivity system 118 and the remote communication system 120, may represent an array or wired networks, wireless networks, or combinations thereof. Further, each of the system(s) of the resources may generally refer to a network-accessible system—or "cloud-based system"—implemented as a computing infrastructure of processors, storage, software, data access, and so forth that is maintained and accessible via the network(s) 118, such as the Internet. Cloud-based systems may not require end-user knowledge of the physical location and configuration of the system that delivers the services. As illustrated, the remote connectivity system 118 and the remote communication system 120 may comprise the network-accessible resource(s), such as servers and/or other devices. Multiple of such resources may be included in the system(s).

Figure 1B:
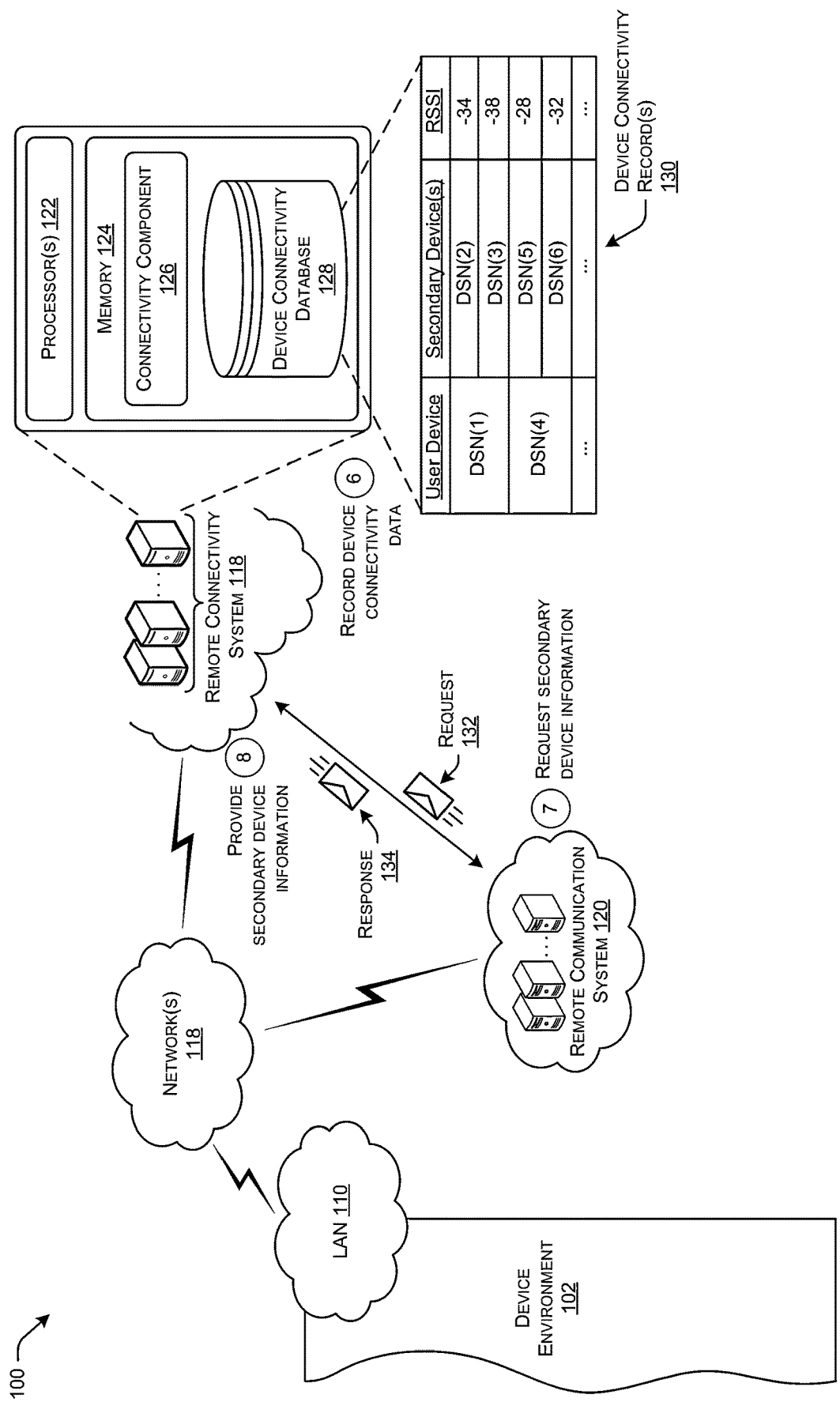
FIG. 1B illustrates the example environment of FIG. 1A in which the remote connectivity system records device-connectivity data received from secondary devices, receives a request from a remote communication system for device-connectivity data associated with a user device, and provides information about secondary device(s) that are associated with the user device.

FIG. 1B illustrates the example environment 100 of FIG. 1A in which the remote connectivity system 118 records, at "6", device-connectivity data received from secondary devices 108. As illustrated, the remote connectivity system 118 may include one or more processors 122 and memory 124. The processor(s) 122 may include a central processing unit (CPU) for processing data and computer-readable instructions, and the memory 124 may store computer-readable instructions that are executable on the processor(s) 122. The memory 124 may individually include volatile random access memory (RAM), non-volatile read only memory (ROM), non-volatile magnetoresistive (MRAM) and/or other types of memory.

As illustrated, the memory 124 may include a connectivity component 126 that is executable to perform the various operations of the remote connectivity system 118. Further, the memory 124 may store a device connectivity database 128 that includes one or more device connectivity records 130. As illustrated, the device connectivity records 130 may include mappings between device identifiers for user devices 106 and secondary devices 108, and may further include indications of RSSI values for advertisements 114 detected by each of the secondary devices 108. These RSSI values may indicate which secondary device 108 is closer to the user device 106 in the device environment 102, and thus, which secondary device 108 may be able to establish a stronger connection with the user device 106. The connectivity component 126 may populate the device connectivity database 128 with information obtained discover messages 116 sent from secondary devices 108 (as described in FIG. 1A). Although not illustrated, the device connectivity records 130 may further store metadata indicating the cause of the connectivity issue that the user device 106 is experiencing. In this way, the remote connectivity system 118 may provide the remote communication system 120 with an indication of what is causing the user device 106 to be unable to connect to a network, and the remote communication system 120 may perform various operations to remedy the connectivity issue.

Generally, the remote communication system 120 may comprise one or more computing devices and/or servers configured to diagnose and/or remedy connectivity issues experienced by user devices 106. In some examples, the remote communication system 120 may include or be associated with a customer service contact, such as a phone number, customer service chat, etc. Thus, the remote communication system 120 may be interacted with using user devices by users 104 (or other entities) to help diagnose, troubleshoot, and/or configure user devices 106 to connect to networks or otherwise remedy issues. In other examples, the remote communication system 120 may be configured to remotely control the user device 106 to perform operations remotely. However, the remote communication system 120 may connect to the user device 106 according to the techniques described herein to communicate various types of data and/or perform various operations.

Thus, the remote communication system 120 may receive a request to remedy an issue with a user device 106, and the remote communication system 120 may, at "7," request secondary device information from the remote connectivity system 118. The request for secondary device information may comprise a device identifier (e.g., DSN) for a user device 106 for which troubleshooting is required to remedy issues. The remote connectivity system 118 may receive the request 132 for secondary device information, and use the device identifier for the user device 106 to query the device connectivity database 128. The connectivity component 126 may identify the device connectivity record 130 for the user device 106 using the device identifier, and determine device identifiers for one or more secondary devices 108 that detected the advertisement 114 broadcasted by the user device 106. In examples where multiple secondary devices 108 reported detecting the advertisement 114, the remote connectivity system 118 may provide a response 134 that includes device identifiers for each of the secondary devices along with RSSI values representing how well each secondary device 108 heard the advertisement 114.

The remote communication system 120 may receive the response 134 indicating the secondary devices 108 that detected the advertisement 114 from the user device 106, and may select one of the secondary devices 108 (in instances where multiple secondary devices 108 detected the advertisement 114) based on their respective RSSIs. For instance, the secondary device 108 with the strongest RSSI may be selected because the secondary device 108 is likely closer to the user device 106 because it detected the advertisement 114 at a higher signal strength, or at least has better connectivity to the user device 106.

Figure 1C:
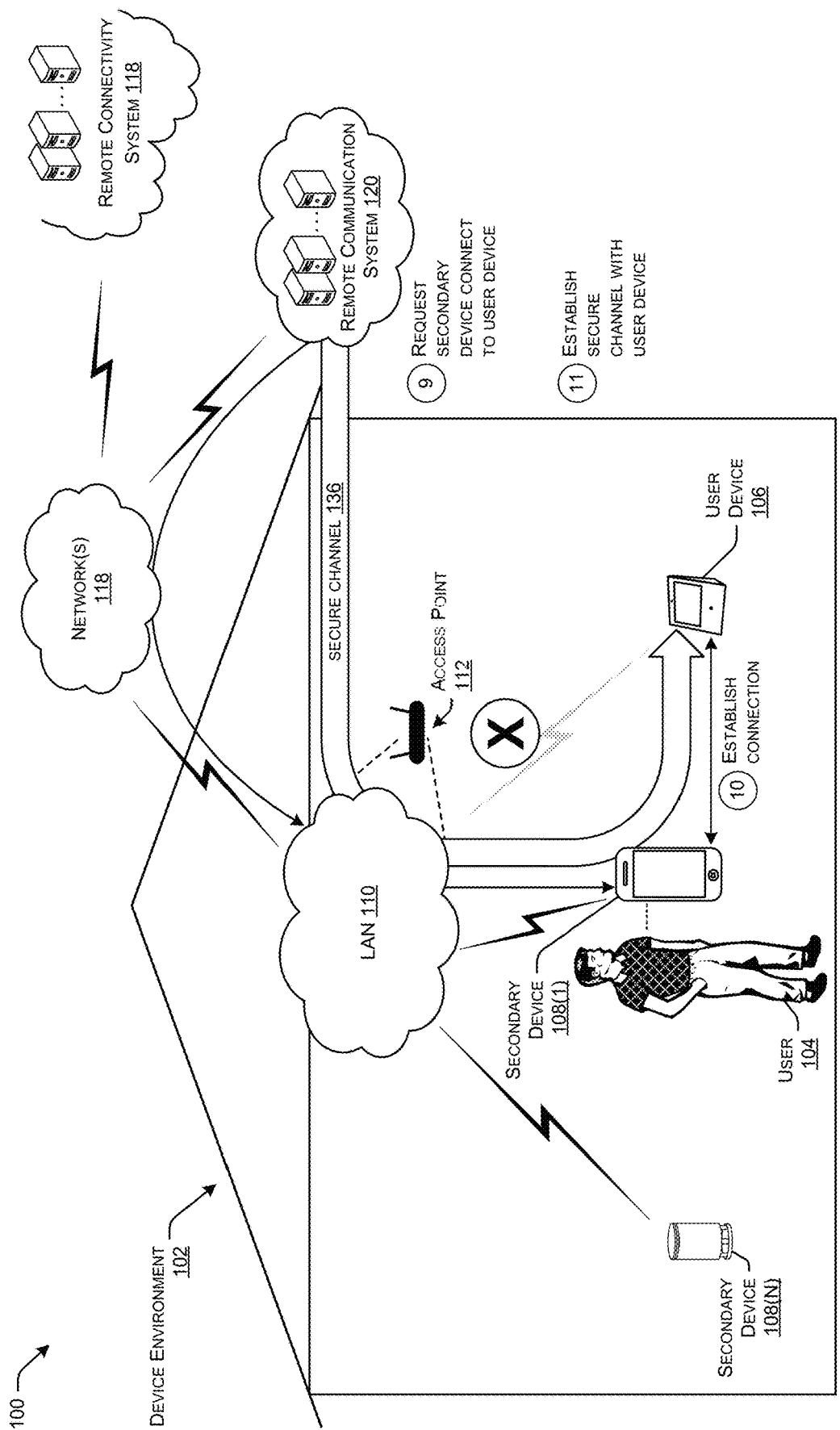
FIG. 1C illustrates the example environment of FIG. 1A in which the remote communication system sends a request to a secondary device to establish a connection with the user device, and establishes an end-to-end secure channel with the user device and using the secondary device as a proxy.

FIG. 1C illustrates the example environment 100 of FIG. 1A in which the remote communication system 120 sends a request to a secondary device to establish a connection with the user device, and establishes an end-to-end secure channel with the user device and using the secondary device as a proxy.

The remote communication system 120 may, at "9," request that the secondary device 108(1) connect to the user device 106. For instance, the remote communication system 120 may send a request to the secondary device 108(1) to establish a connection using a PAN protocol, such as BLE. At "10," the secondary device 108(1) may establish the connection with the user device 106, such as by performing a handshake according to the BLE protocol.

At "11," the remote communication system 120 may establish a secure channel with the user device 106. For instance, the remote communication system 120 may have established a first connection with the secondary device 108(1), such as by using TCP/IP, and caused the secondary device 108(1) to establish a second connection with the user device 106 using the BLE protocol. The secondary device 108(1) may, in this example, serve as a proxy server by simply receiving and forwarding IP data packets between the user device 106 and the remote communication system 120. Thus, the remote communication system 120 and user device 106 may communicate using various encryption protocols, such as the TLS protocol, a Secure Sockets Layer (SSL) protocol, and/or any other type of cryptographic protocol used to establish a secure channel 136 (also referred to as secure tunnel, secure communication channel, etc.).

Using the secure channel 136, the remote communication system 120 may communicate with the user device 106 using the secondary device 108(1) as a proxy. For instance, the remote communication system 120 may cause the user device 106 to perform one or more remedial operations, such as rebooting the device 106, exporting an event log associated with software running on the user device 106, etc.

Figure 1D:
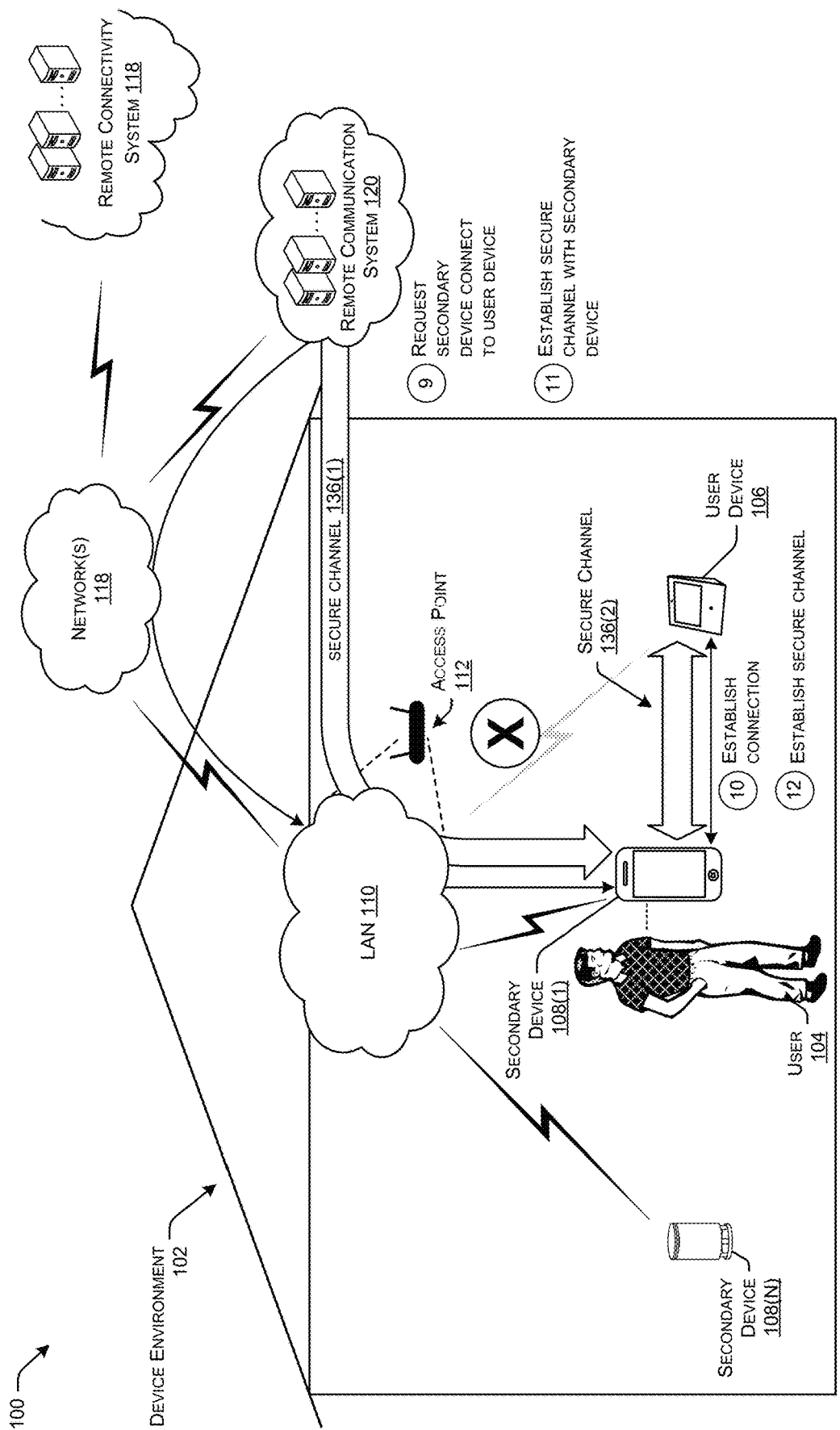
FIG. 1D illustrates another example environment of FIG. 1A in which the remote communication system sends a request to a secondary device to establish a connection with the user device. The remote communication system then establishes a first secure channel with the secondary device, and the secondary device establishes a second secure channel with the user device. The remote communication system is then able to communicate with the user device using the two secure channels and through the secondary device.

FIG. 1D illustrates another example environment of FIG. 1A in which the remote communication system 120 sends a request to the secondary device 108(1) to establish a connection with the user device 106. As illustrated, the remote communication system 120 may perform step "9" similar to that described in FIG. 1C where the remote communication system 120 requests the secondary device 108(1) to connect to the user device 106. Further, the secondary device 108(1) may similarly, at "10," establish the connection using, for example, the BLE protocol.

However, unlike FIG. 1C, the remote communication system 120 may then, at "11," establish a first secure channel 136(1) with the secondary device 108(1), and the secondary device may, at "12," establish a second secure channel 136(2) with the user device 106. The remote communication system 120 is then able to communicate with the user device 106 using the two secure channels and through the secondary device 108(1). In this example, the secondary device 108(1) may have to decrypt data received from the remote communication system 120 via the secure channel 136(1), and then encrypt that data to be sent to the user device 106 using the second secure channel 136(2) (and vice-versa when the user device 106 sends data to the remote communication system 120). Thus, the secondary device 108(1) may serve as a middle man to encrypt and decrypt data communicated using two different secure channels 136(1) and 136(2).

Figure 2:
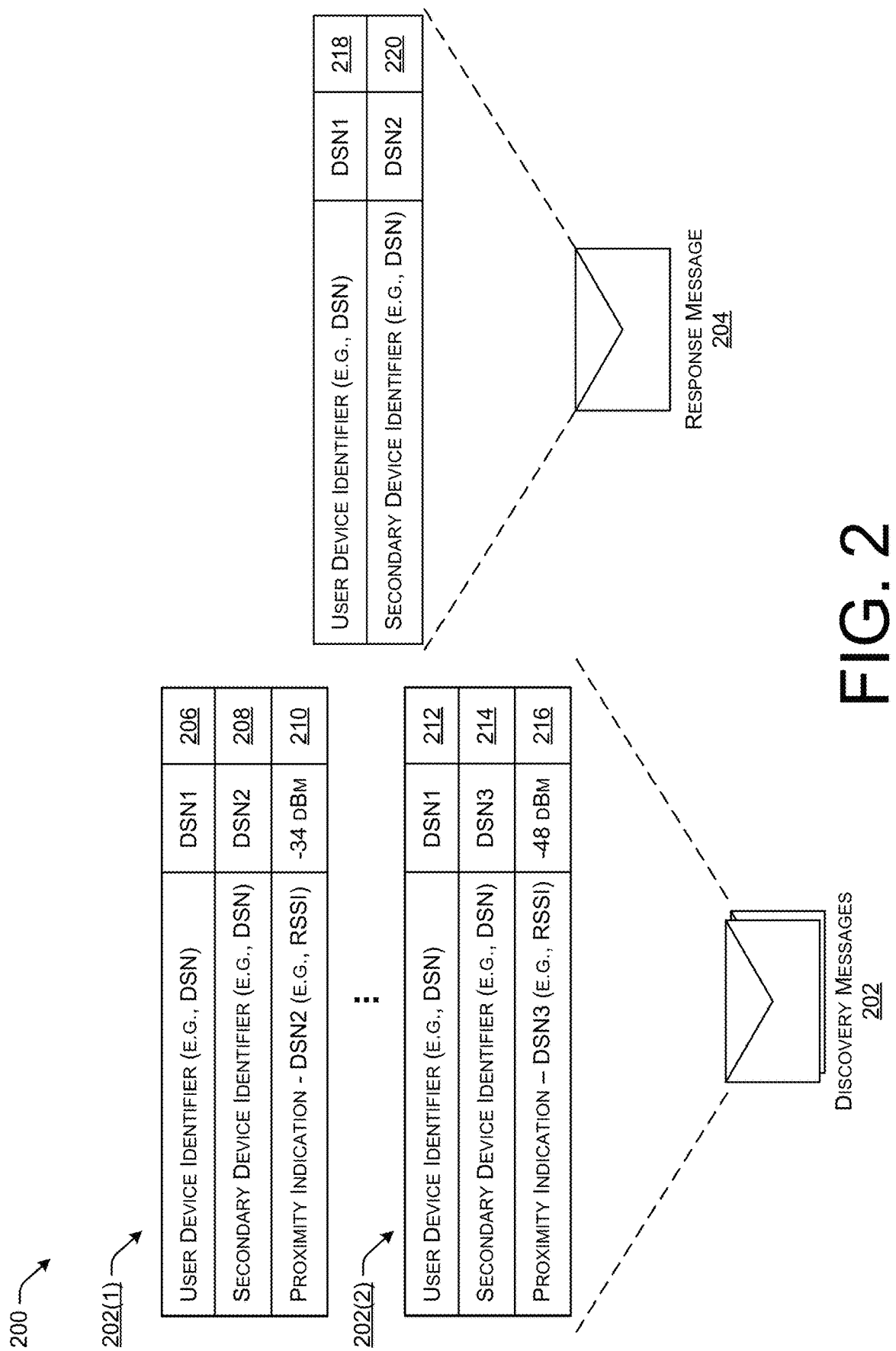
FIG. 2 illustrates an example of discovery messages sent from secondary devices that detected an advertisement from a user device experiencing connectivity issues. The discovery messages are sent from the secondary devices to a remote connectivity system. Further, an example request message is illustrated where a remote communication system has selected one of the secondary devices to establish a connection with the user device.

FIG. 2 illustrates an example of discovery messages 202 sent from secondary devices 108(1)-(N) that detected an advertisement 114 from a user device 106 experiencing connectivity issues. The discovery messages 202 may be sent from the secondary devices 108 to a remote connectivity system 118.

In an example, the discovery message 202(1) may be sent by the secondary device 108(1), and the discovery message 202(2) may be sent by the secondary device 108(N). The discovery message 202(1) may include a user device identifier 206 for the user device 106 that broadcasted the advertisement 114, as well as a secondary device identifier 208 for the secondary device 108(1) itself, and may further include a proximity indication 210, such as an RSSI of −34 dBm, determined by receiving the advertisement 114. Similarly, the discovery message 202(2) may be sent by the secondary device 108(N), and may include a user device identifier 212 for the user device 106 that broadcasted the advertisement 114, as well as a secondary device identifier 214 for the secondary device 108(N) itself, and may further include a proximity indication 216, such as an RSSI of −48 dBm, determined by receiving the advertisement 114.

FIG. 2 further illustrates an example response message 204 (e.g., response 134) that is sent from the remote communication system 120 and to the secondary device 108(1). The response message 204 may include an address or other secondary device identifier 220 for the secondary device 108(1), and may further include a user device identifier 218 for the user device 106. In this example, the remote communication system 120 may select the secondary device 108(1) to establish the connection with the user device 106 due to the RSSI indicating stronger signal strength of the advertisement 114 detected at the secondary device 108(1)

compared to the secondary device 108(N). As illustrated, the response message 204 may include the secondary device identifier 220 of DSN2 because that device had the stronger RSSI 210 as compared to RSSI 216.

Figure 3:
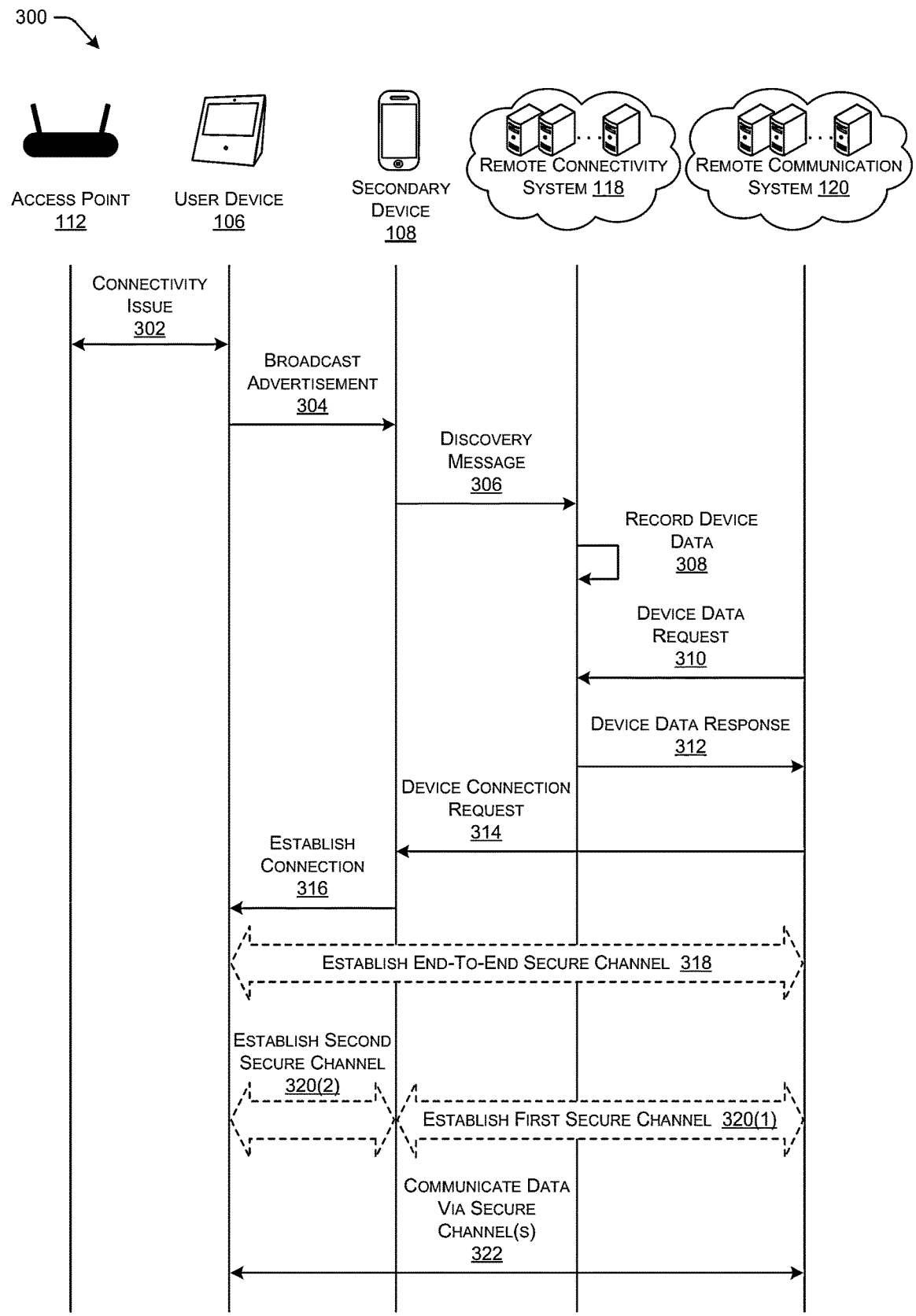
FIG. 3 illustrates an example signal flow diagram of operations that a user device, a secondary device, a remote connectivity system, and a remote communication system may perform to enable remote communication by a remote communication system with a user device that is experiencing connectivity issues with one or more networks.

FIG. 3 illustrates an example signal flow diagram 300 of operations that a user device 106, a secondary device 108, a remote connectivity system 118, and a remote communication system 120 may perform to enable remote communication by the remote communication system 120 with the user device 106 that is experiencing connectivity issues with one or more networks.

At 302, the user device 106 may detect connectivity issues with the access point 112. For example, the user device 106 may determine a connectivity issue such as dropping of connectivity to the access point 112, incorrect credentials (e.g., password) to connect to the access point 112, limited (or no) connectivity from an Internet Service Provider (ISP), etc.

At 304, user device 106 may broadcast an advertisement to one or more secondary devices 108. The advertisement may, in some examples, be a BLE beacon or advertisement message that is broadcasted and includes an indication of the connectivity issue in the payload and may further include a user device identifier of the user device 106. In some instances, the advertisement may, along with indicating a connectivity issue (e.g., lack of or poor connectivity, unable to connect to a network, etc.), the advertisement at 304 may further include metadata indicating a cause of the connectivity issue being experienced by the user device 106.

At 306, the secondary device 108 may, in response to detecting the advertisement, send a discover message to the remote connectivity system 118. The discovery message 116 may indicate that the secondary device 108 heard the advertisement 114 sent from the user device 106, and may further include a device identifier for the user device 106 (e.g., a device serial number (DSN)). Further, the discovery message 116 may include a device identifier (DSN) for the secondary device 108, and may potentially include the RSSI for the advertisement 114 detected at, and calculated by, the secondary device 108.

At 308, the remote connectivity system 118 may record device data locally. For instance, the remote connectivity system 118 may create and/or modify a device connectivity record 130 in a device connectivity database 128.

At 310, the remote communication system may send a device data request to the remote connectivity system 118. The request 132 sent may include a request for secondary device information, and include the device identifier for the user device 106 to query the device connectivity database 128. The connectivity component 126 may identify the device connectivity record 130 for the user device 106 using the device identifier, and determine device identifiers for the secondary device 108 that detected the advertisement 114 broadcasted by the user device 106.

At 312, the remote connectivity system 118 may send a device data response to the remote communication system 120 that includes an indication of which secondary device 108 to connect to and/or an indication of a secondary device 108 that detected the advertisement at 304.

At 314, the remote communication system 120 (and/or the remote connectivity system 118) may send a device connection request 314 to the secondary device 108. The device connection request 314 may include an instruction for the secondary device 108 to establish a connection with the user device 106.

At 316, the secondary device 108 may establish a connection 316 with the user device 106. The connection may be established between the secondary device 108 and the user device 106 using, for example, the BLE protocol.

One of the two next steps are optionally performed. That is, either 318 or 320 are performed. For instance, at 318, the remote communication system 120 may establish an end-to-end secure channel using a cryptographic protocol, such as TLS. The secondary device 108 may simply behave as a proxy server in this example and may never actually have access to information in the encrypted IP data packets communicated between the remote communication system 120 and the user device 106.

Alternatively, at 320(1) the secondary device 108 may establish a first secure channel 320(1) with the remote communication system 120, and the secondary device 108, may 320(2) establish a second secure channel with the user device 106 over the BLE connection. In this example, the secondary device 108 may decrypt and re-encrypt the IP data packets when communicating the IP data packets between the remote communication system 120 and the user device 106 using the two secure channels 320(1) and 320(2).

At 322, the remote communication system 120 and the user device 106 may communicate data via the one or more secure channels (e.g., either 318 or both of 320(1) and 320(2). The data communication may include the remote communication system 120 causing the user device 106 to perform one or more remedial operations to remedy the connectivity issue.

Figure 4:
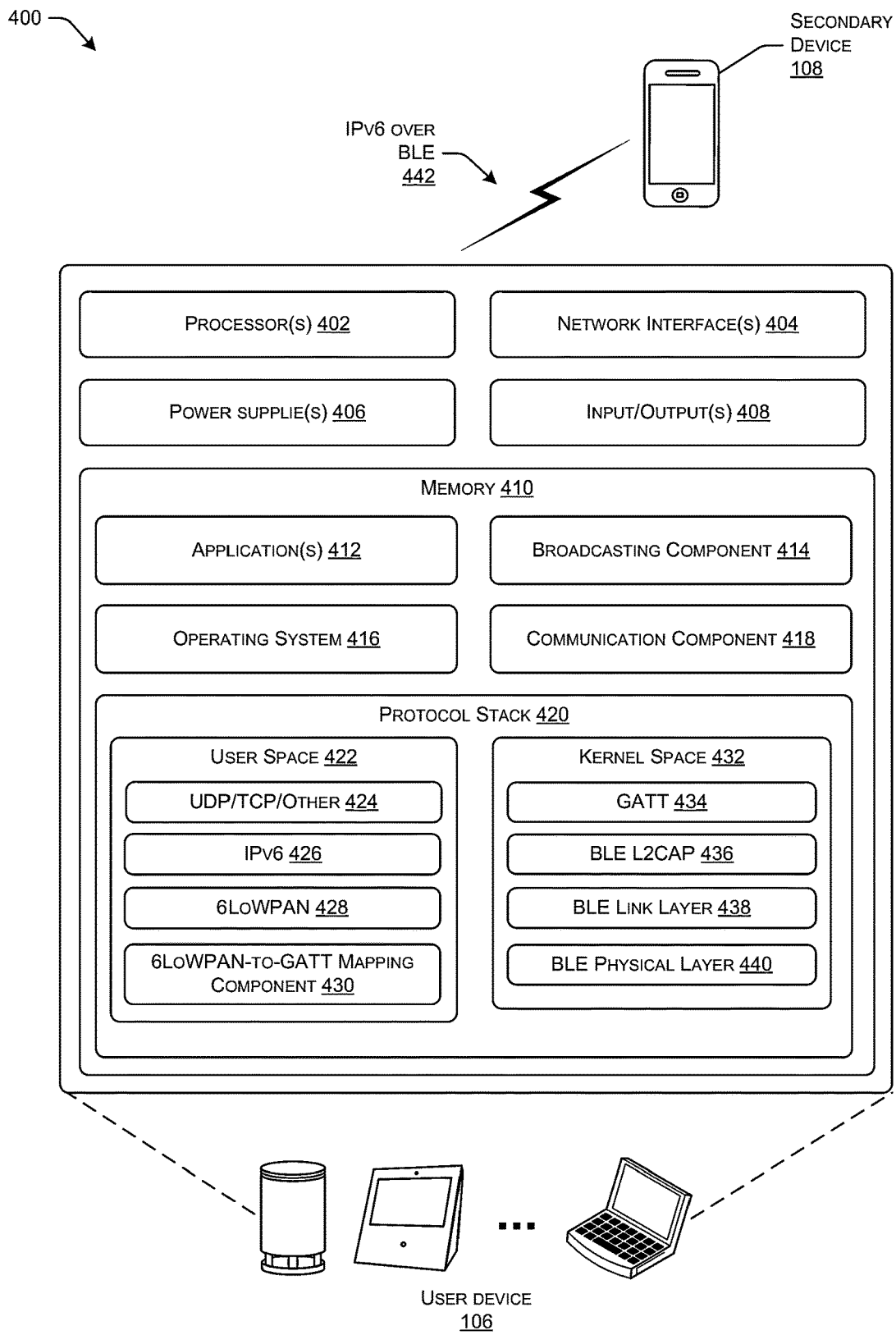
FIG. 4 illustrates example components of the user device of FIGS. 1A-1D.

FIG. 4 illustrates example components of the user device 106 of FIGS. 1A-1D, 2, and 3. As illustrated, the user device 106 may comprise any type of user device 106, such as voice-controlled assistants, tablet computing devices, smart televisions (TVs), laptop computer, desktop computers, mobile phones, display devices, audio devices, gaming devices, and/or the like.

The user device 106 may include one or more processors 402, one or more network interfaces 404, and one or more power supplies 406. The processors 402 may include a central processing unit (CPU) for processing data and computer-readable instructions, and the network interfaces 404 may enable the user device 106 to communicate with other devices and may be a radio, network interface card (NIC), software components, and/or any other hardware, software, or any combination thereof to enable the user device 106 to communicate over various networks and using various protocols.

The user device 106 may include one or more input/outputs 408, such as buttons, displays, touch screens, microphones, speakers, lights, sensors, haptic sensors, and/or any other means to receive inputs and provide outputs.

Further, the user device 106 may include memory 410 and may store or include computer-readable instructions that are executable on the processor(s) 402. The memory 410 may individually include volatile random access memory (RAM), non-volatile read only memory (ROM), non-volatile magnetoresistive (MRAM) and/or other types of memory. As illustrated, the memory 410 may store one or more applications 412 that provide various functionality for the user device 106, depending on the type of device 106. Further, the memory 410 may store a broadcasting component 414 that causes the user device 106 to broadcast an advertisement 114 upon detecting a connectivity issue as described herein.

Further, the memory 410 may store an operating system 416 that includes software that supports a computer's basic functions, such as scheduling tasks, executing applications, controlling peripherals, etc. Further, the memory 410 may store a communication component 418 that performs the communications described herein. For instance, the communication component 418 may enable the user device to communicate, using the network interface(s) 404, with other devices, such as the secondary devices 108.

As shown, the memory 410 may further store a protocol stack 420 that enables the user device 106 to communicate using various networking protocols. As illustrated, the protocol stack 420 may have a portion stored in user space 422 of the memory 410, and kernel space 430 of the memory 410. Generally, the memory 410 (e.g., RAM) of the user device 106 may include the user space 422 and the kernel space 430. Generally, the user space 422 may include a set of locations where processes or application runs that generally do not have privilege or access to the kernel space 430. The user space 422 and kernel space 430 may be virtually segregated portions of the memory 410. In some examples, the kernel space 430 is strictly reserved for running a privileged kernel of an operating system 416, including kernel extensions and most device drivers. In contrast, user space is the memory area where software such as applications, and some drivers, execute that do not have privileges to the kernel space 430.

As noted above, the user device 106 may communicate using TCP/IPv6 over BLE. For example, the Bluetooth SIG has developed RFC 7668 to support IPv6 over BLE. The use of IPv6 over BLE adds Low-power Wireless Personal Area Networks (6LoWPAN) on top of the Logical link control and adaptation protocol (L2CAP) protocol layer of the BLE protocol stack. The L2CAP protocol layer simplifier the IP headers, compresses data, and encapsulates the IP data packets to allow them to be sent via BLE. However, this implementation may require that the TCP/IP stack and the 6LowPAN stack be in the kernel space 430.

Accordingly, the user space 422 of the memory 410 may store a portion of the protocol stack 420 including, for example, a UDP/TCP/other 424 protocol stack, an IPv6 426 protocol stack, and a 6LowPAN 428 protocol stack. Certain types of user devices 106 may not grant privilege for applications or software to change the devices' TCP/IP configurations, which are traditionally in the kernel space 432. Accordingly, by moving the TCP, IP, 6LoWPAN protocol stacks 424, 426, and 428 into the user space 422 of the user devices 106, the devices can redirect any 6LoWPAN input/output to a BLE Generic Attribute Profile (GATT) service and establish an end-to-end tunnel using applications or other software running on the user devices and secondary devices.

However, in some instances the entire protocol stack 420 may be stored in the kernel space 432 (traditional implementation). In such examples, the user device 106 may include or utilize a protocol stack 420 as defined by RFC 7668 to support IPv6 over BLE, where the protocol stack 420 is stored in the kernel space 432.

However as noted above, in some instances at least a portion of the protocol stack 430 may be stored in user space memory 422 of the user device 106. In such examples, the protocol stack 420 may further include a 6LoWPAN-to-GATT mapping component 430, which may be a driver or other program that sits on top of the GATT profile 434. That is, the 6LoWPAN-to-GATT mapping component 430 may map inputs and outputs between the 6LoWPAN stack 428 and the GATT stack 434 that is in the kernel space 432.

Further, as illustrated, the kernel space 432 may store and operate the GATT stack 434, a BLE L2CAP protocol stack 436, a BLE link layer stack 438, and a BLE physical layer stack 438. In this way, the user space 422 includes portions of the protocol stack 420 that are needed to perform the techniques of this invention and are accessible and usable by the communication component 418 to perform the communications described herein. For instance, the user device 106 is configured to communicate with the secondary device 108 using the protocol stack 420 according to IPv6 over BLE 442. The 6LoWPAN-to-GATT mapping component 430 may generally input and output connections to a standard GATT 434 of a BLE Tx/Rx interface. Accordingly, the 6LoWPAN-to-GATT mapping component 430 may generally be a modification to the RFC 7668 by including the 6LoWPAN-to-GATT mapping component 430, and by having portions of the protocol stack 420 stored in the user space 422 and portions of the protocol stack 420 stored in the kernel space 432 as described herein.

Figure 5:
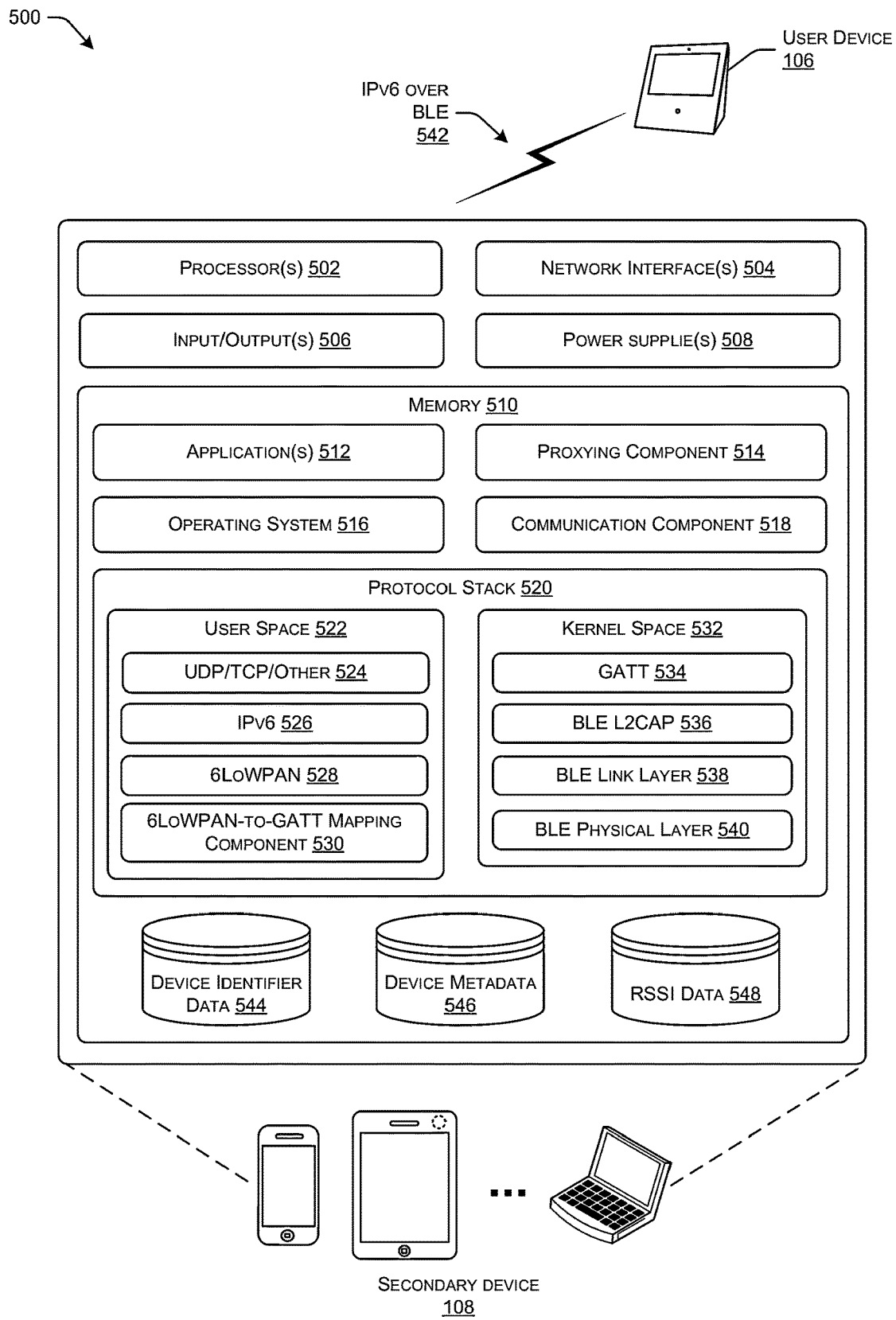
FIG. 5 illustrates example components of the secondary device(s) of FIGS. 1A-1D.

FIG. 5 illustrates example components of the secondary device 108 of FIGS. 1A-1D, 2, and 3. As illustrated, the secondary device 108 may comprise any type of secondary device 108, such as voice-controlled assistants, tablet computing devices, smart televisions (TVs), laptop computer, desktop computers, mobile phones, display devices, audio devices, gaming devices, and/or the like.

The secondary device 108 may include one or more processors 502, one or more network interfaces 505, and one or more power supplies 506. The processors 502 may include a central processing unit (CPU) for processing data and computer-readable instructions, and the network interfaces 504 may enable the secondary device 108 to communicate with other devices and may be a radio, network interface card (NIC), software components, and/or any other hardware, software, or any combination thereof to enable the secondary device 108 to communicate over various networks and using various protocols.

The secondary device 108 may include one or more input/outputs 508, such as buttons, displays, touch screens, microphones, speakers, lights, sensors, haptic sensors, and/or any other means to receive inputs and provide outputs.

Further, the secondary device 108 may include memory 510 and may store or include computer-readable instructions that are executable on the processor(s) 502. The memory 510 may individually include volatile random access memory (RAM), non-volatile read only memory (ROM), non-volatile magnetoresistive (MRAM) and/or other types of memory. As illustrated, the memory 510 may store one or more applications 512 that provide various functionality for the secondary device 108, depending on the type of device 106. Further, the memory 510 may store a broadcasting component 514 that causes the secondary device 108 to broadcast an advertisement 114 upon detecting a connectivity issue as described herein.

Further, the memory 510 may store an operating system 516 that includes software that supports a computer's basic functions, such as scheduling tasks, executing applications, controlling peripherals, etc. Further, the memory 510 may store a communication component 518 that performs the communications described herein. For instance, the communication component 518 may enable the user device to communicate, using the network interface(s) 504, with other devices, such as the secondary devices 108.

As shown, the memory 510 may further store a protocol stack 520 that enables the secondary device 108 to communicate using various networking protocols. As illustrated, the protocol stack 520 may have a portion stored in user space 522 of the memory 510, and kernel space 532 of the memory 510. Generally, the memory 510 (e.g., RAM) of the secondary device 108 may include the user space 522 and the kernel space 532. Generally, the user space 522 may include a set of locations where processes or application runs that generally do not have privilege or access to the kernel space 532. The user space 522 and kernel space 532 may be virtually segregated portions of the memory 510. In some examples, the kernel space 532 is strictly reserved for running a privileged kernel of an operating system 516, including kernel extensions and most device drivers. In contrast, user space is the memory area where software such as applications, and some drivers, execute that do not have privileges to the kernel space 532.

As noted above, the secondary device 108 may communicate using TCP/IPv6 over BLE. For example, the Bluetooth SIG has developed RFC 7668 to support IPv6 over BLE. The use of IPv6 over BLE adds Low-power Wireless Personal Area Networks (6LoWPAN) on top of the Logical link control and adaptation protocol (L2CAP) protocol layer of the BLE protocol stack. The L2CAP protocol layer simplifier the IP headers, compresses data, and encapsulates the IP data packets to allow them to be sent via BLE. However, this implementation may require that the TCP/IP stack and the 6LowPAN stack be in the kernel space 532.

Accordingly, the user space 522 of the memory 510 may store a portion of the protocol stack 520 including, for example, a UDP/TCP/other 524 protocol stack, an IPv6 526 protocol stack, and a 6LowPAN 528 protocol stack. Certain types of user devices 106 may not grant privilege for applications or software to change the devices' TCP/IP configurations, which are traditionally in the kernel space 532. Accordingly, by moving the TCP, IP, 6LoWPAN protocol stacks 524, 526, and 528 into the user space 522 of the user devices 106, the devices can redirect any 6LoWPAN input/output to a BLE Generic Attribute Profile (GATT) service and establish an end-to-end tunnel using applications or other software running on the user devices and secondary devices. Additionally, the user space 522 may include a 6LoWPAN-to-GATT mapping component 530 (e.g., the same as or similar to 6LoWPAN-to-GATT mapping component 430).

Further, as illustrated, the kernel space 532 may store and operate the GATT stack 534, a BLE L2CAP protocol stack 536, a BLE link layer stack 538, and a BLE physical layer stack 540. In this way, the user space 522 includes portions of the protocol stack 520 that are needed to perform the techniques of this invention and are accessible and usable by the communication component 518 to perform the communications described herein. For instance, the secondary device 108 is configured to communicate with the user device 106 using the protocol stack 520 according to IPv6 over BLE 542.

Further, the secondary device 108 may include device identifier data 544 indicating device identifiers for user devices 106 that broadcasted advertisements 114. In some examples, the secondary device 108 may further store device metadata 546, such as root causes for the user device 106 experiencing network connectivity issues. Additionally, the secondary device 108 may store RSSI data 548 indicating RSSI value(s) for the advertisements 114 detected at the secondary device 108. Insofar as components of the secondary device 108 are similar to those of the user device 106 described in FIG. 4, the components may have similar functionality as described herein.

As used herein, a processor, such as processor(s) 122, 402, and/or 502, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 122, 402, and/or 502 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 122, 402, and/or 502 may possess its own local memory, which also may store program components, program data, and/or one or more operating systems.

As described herein, the memories 124, 410, and 510 may include or comprise computer-readable media and may include volatile and nonvolatile memory, removable and non-removable media implemented in any method or technology for storage of information, such as computer-readable instructions, data structures, program component, or other data. Such computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 122, 402, and/or 502 to execute instructions stored on the computer-readable media. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 124, 410, and/or 510, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

FIGS. 6A, 6B, 7, and 8 illustrate flow diagrams of an example processes 600, 700, and 800 for performing the techniques described herein. The processes 600, 700, and 800, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Figure 6A:
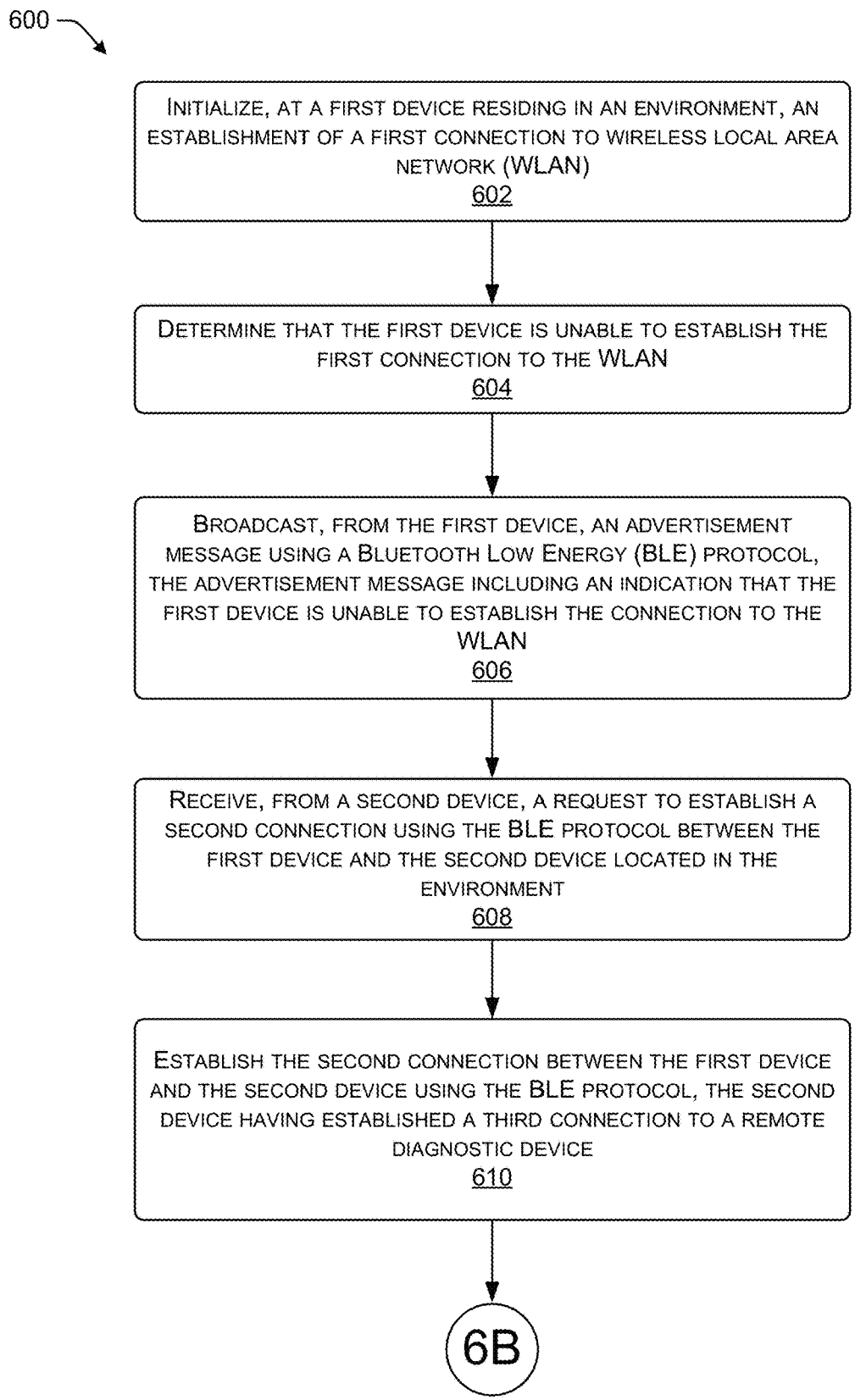
FIGS. 6A-6B collectively illustrate an example method for a user device to determine that it is unable to connect to a wireless local area network (WLAN), and broadcast an advertisement message using a BLE protocol to a secondary device. The user device establishes a connection to the secondary device, which is in turn connected to a remote communication system, and the user device performs a remedial action that is instructed by the remote communication system and received through the secondary device.
Figure 6B:
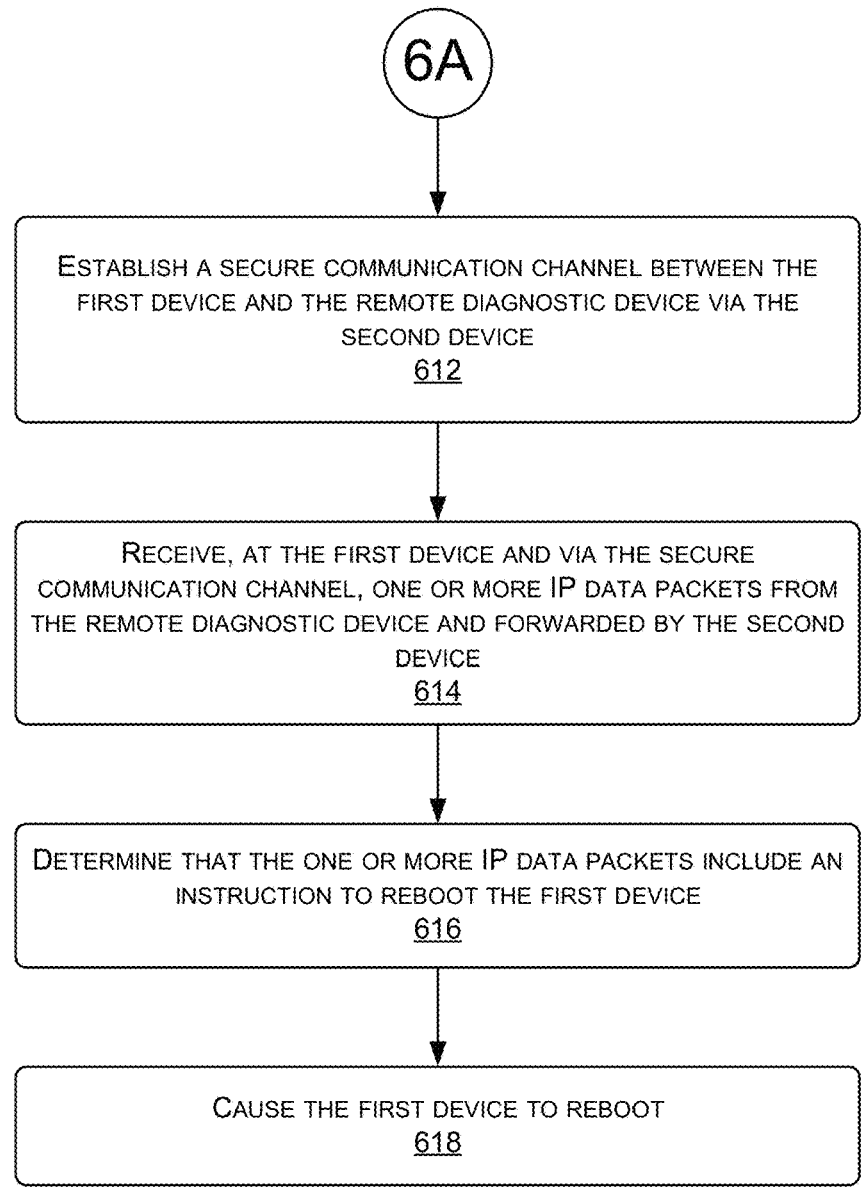

FIGS. 6A-6B collectively illustrate an example process 600 for a user device 106 to determine that it is unable to connect to a wireless local area network (WLAN) 110, and broadcast an advertisement message 114 using a BLE protocol to a secondary device 108. The user device 106 establishes a connection to the secondary device 108, which is in turn connected to a remote communication system 120, and the user device 106 performs a remedial action that is instructed by the remote communication system 120 and received through the secondary device 108.

At 602, the first device, residing in an environment, may initialize an establishment of a first connection to wireless local area network (WLAN). For instance, the first device 106 (e.g., user device 106) may attempt to connect or reconnect to a WLAN 110.

At 604, the first device may determine that it is unable to establish the first connection to the WLAN. For instance, the user device 106 may determine there is a connectivity issue that is preventing connection to the WLAN 110, such as repeated disconnects (e.g., more than a threshold number of disconnects), incorrect passwords and/or other credentials, etc.

At 606, the first device may broadcast an advertisement message using a Bluetooth Low Energy (BLE) protocol. In some examples, the advertisement message includes an indication that the first device is unable to establish the connection to the WLAN. For example, the user device 106 may broadcast the advertisement 114 using a BLE protocol, and the BLE advertisement 114 may indicate that the user device 106 is unable to establish a connection to the WLAN 110, or is otherwise experiencing connectivity issues. In even further examples, the advertisement 114 may include metadata indicating a cause of the user device 106 being unable to connect to the WLAN 110.

At 608, the first device may receive a request to establish a second connection using the BLE protocol between the first device and a second device located in the environment (or otherwise in vicinity). For instance, the user device 106 may receive a request from a secondary device 108 located in the environment 102 to establish a connection using the BLE protocol. The secondary device 108 may have received an instruction to establish the connection using the BLE protocol from the remote communication system.

At 610, the first device may establish the second connection with the second device using the BLE protocol. For instance, the user device 106 may establish the second connection with the secondary device 108 using the BLE protocol. In such examples, the secondary device 108 may have established a third connection to a remote diagnostic device (e.g., remote communication system 120) at least partly using Internet Protocol (IP) (e.g., over an Internet network 118).

At 612, the first device may establish a secure communication channel with the remote diagnostic device via the second device. For instance, the user device 106 may establish a secure channel 126, such as a TLS channel, with the remote communication system 120 via the secondary device 108 acting as a proxy server.

At 614, the first device may receive, via the secure communication channel, one or more IP data packets sent from the remote diagnostic device and forwarded by the second device using the BLE protocol. For example, the user device may receive, via the secure channel 126 one or more IPv6 data packets (e.g., encrypted packets) forwarded by the secondary device 108 over the BLE protocol, at originally sent from the from the remote communication system 120.

At 616, the first device may determine that the one or more IP data packets include an instruction to reboot the first device (or perform a remedial action). For instance, the user device 106 may decrypt the one or more IPv6 patches and identify an instruction in a payload of the packet(s) to identify the instruction to perform a remedial action, such as rebooting or restarting the user device 106.

At 618, the first device may cause the first device to reboot (e.g., perform the remedial action). For instance, a user device 106 may perform at least one of causing the user device 106 to reboot, or sending, to the remote communication system 120, one or more additional IPv6 data packets representing an event log file for a software program executing on the user device 106.

Figure 7:
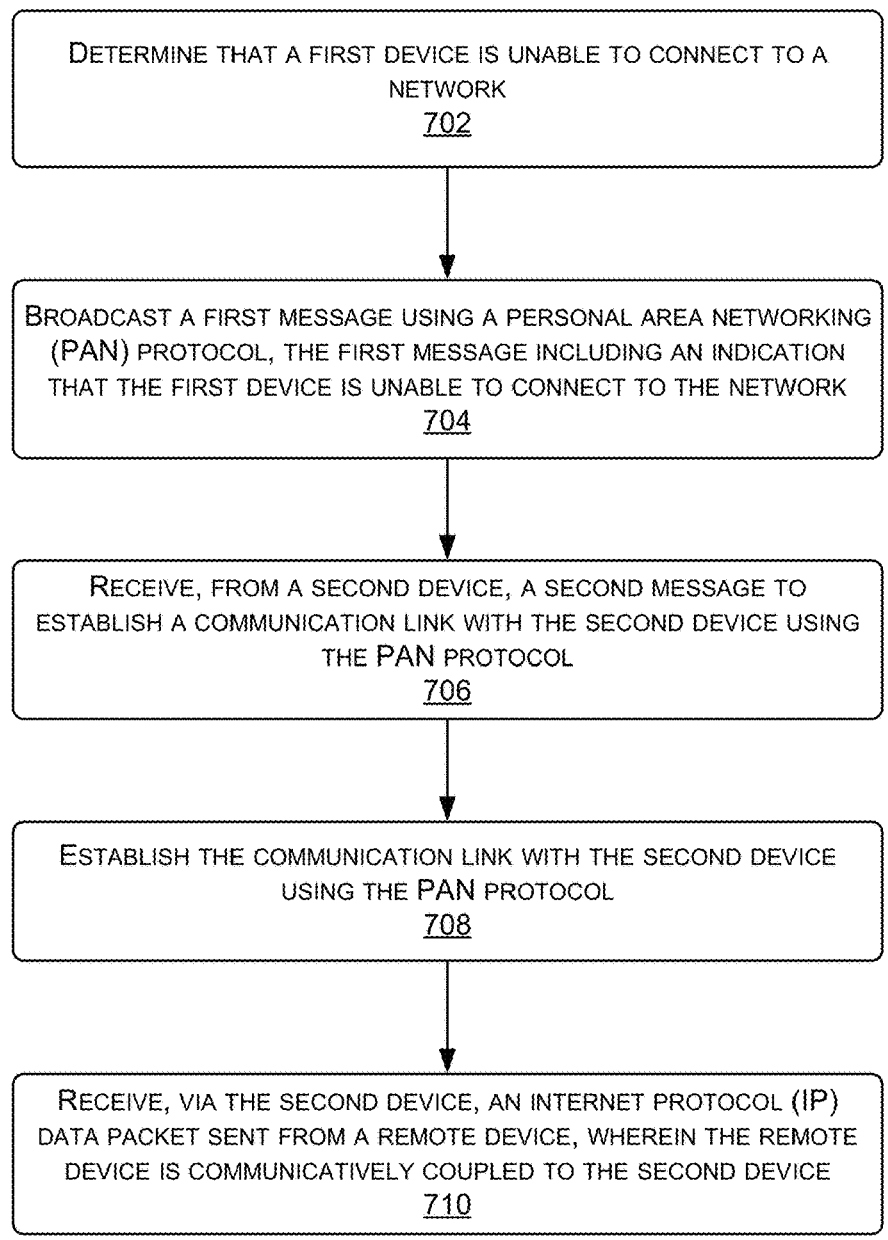
FIG. 7 illustrates a flow diagram of an example method for a user device to determine a lack of connectivity associated with connecting to a WLAN, broadcasting an advertisement message to a secondary device, and establishing a connection with the secondary device using a personal area networking (PAN) protocol. The user device is then able to receive an Internet Protocol (IP) packet from a remote communication system and forwarded by the secondary device over the connection.

FIG. 7 illustrates a flow diagram of an example method 700 for a user device to determine a lack of connectivity associated with connecting to a WLAN, broadcasting an advertisement message to a secondary device, and establishing a connection with the secondary device using a personal area networking (PAN) protocol. The user device is then able to receive an Internet Protocol (IP) packet from a remote communication system and forwarded by the secondary device over the connection. In some instances, the method 700 may be performed by a first device (e.g., user device 106) comprising one or more processors, and one or more computer-readable media storing computer-executable instructions that, when executed by the one or more processors, cause the one or more processors to perform operations of method 700.

At 702, the first device may determine that the first device is unable to connect to a network. The network may be a LAN 110 (e.g., WLAN such as WiFi, Ethernet, etc.), the Internet 118, and/or any other network to which the first device is attempting to connect. For instance, a user device 106 may detect more than a threshold number of disconnections from the LAN 110, detect less than a threshold amount of bandwidth provided by an Internet Service Provider (ISP) for with communicating over the Internet 118, detecting input of incorrect access credentials for connecting to the WLAN, and/or detecting a crash in software associated with connecting to the LAN 110.

At 704, the first device may broadcast a first message using a personal area networking (PAN) protocol where the first message includes an indication that the first device is unable to connect to the network. For instance, the user device 106 may, responsive to determining that it is unable to connect to the network (e.g., network 118, LAN 110, broadcast an advertisement 114 using a BLE protocol.

At 706, the first device may receive, from a second device, a second message to establish a communication link with a second device using the PAN protocol. For instance, the user device 106 may receive a request from the secondary device 108 to establish a communication link using the BLE protocol (e.g., part of the BLE handshake).

At 708, the first device may establish the communication link with the second device using the PAN protocol. For instance, the user device 106 may utilize a handshake of the BLE protocol to establish a connection.

At 710, the first device may receive, from the second device, an internet protocol (IP) data packet sent from a remote device, where the remote device is communicatively coupled to the second device. For instance, the user device 106 may receive, via the BLE connection with the secondary device 108, an IPv6 data packet over BLE send from the remote communication system 120.

In some examples, the method 700 may further comprise establishing, at least partly using the connection with the secondary device 108, a secure communication channel with the remote diagnostic device 120 using a transport layer security (TLS) protocol, and in such examples, the IP data packet is received via the secure communication channel (e.g., encrypted).

In some examples, the method 700 may further include determining that the IP data packet includes an instruction to perform a remedial action. The method may further include performing the remedial action. The remedial action may include causing the first device to reboot, or sending one or more additional IP data packets to the remote diagnostic device 120. In some instances, these IP data packets may include an event log file for a software program executing on the first device 106.

In some instances, the first device may be the user device 106 and includes system memory 410 including a user space 422 allocated for use by software running on the user device 106 and kernel space 430 allocated for use by a kernel of the user device 106. In such examples, the user space 422 may store a first portion of protocol stack used to receive the IP data packet, where the first portion of protocol stack comprises a transport control layer (TCP) protocol stack 424, an IPv6 protocol stack 426, an IPv6 and Low-power Wireless Personal Area Networks (6LoWPAN) protocol stack 428.

Figure 8:
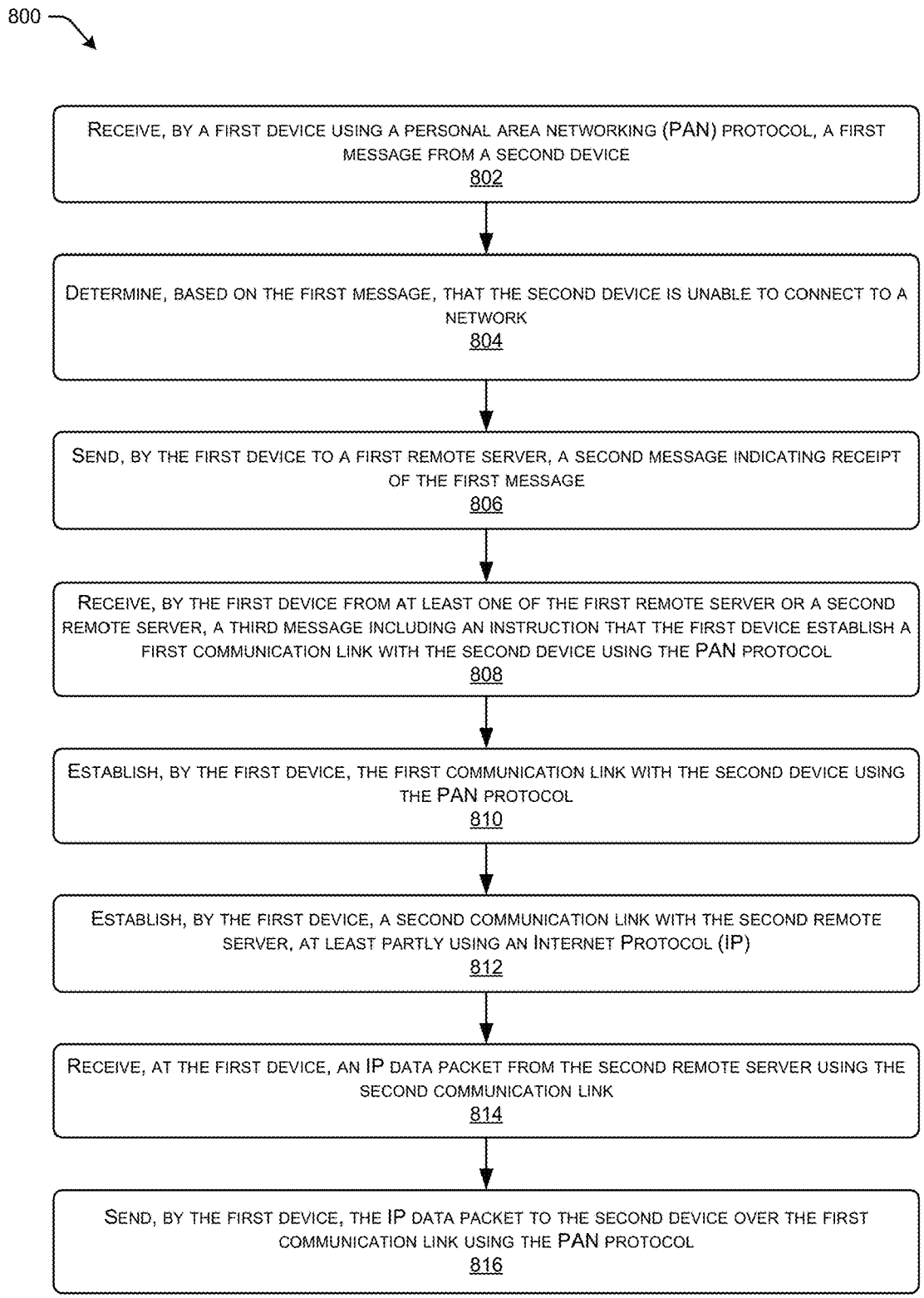
FIG. 8 illustrates a flow diagram of an example method for a secondary device to establish a connection with a user device that is experiencing a lack of connectivity to a WLAN, and proxying communication data from a remote communication system and to the user device.

FIG. 8 illustrates a flow diagram of an example method 800 for a secondary device to establish a connection with a user device 106 that is experiencing a lack of connectivity to a WLAN 110, and proxying communication data from a remote communication system and to the user device.

At 802, a first device may receive a first message from a second device using a personal area networking (PAN) protocol. For instance, the secondary device 108 may detect the advertisement 114 broadcasted from the user device 106 via a BLE protocol.

At 804, the first device may determine, based on the first message, that the second device is unable to connect to a network. For instance, the secondary device 108 may identify, from the advertisement 114, an indication that the user device 106 is experiencing lack of connectivity associated with connecting to a WLAN 110, network 118, etc.

At 806, the first device may send, to a first remote server, a second message indicating receipt of the first message. For instance, the secondary device 108 may send, to the remote connectivity system 118, a discovery message 116 indicating that the secondary device 108 detected the advertisement 114 broadcasted from the user device 106 that is unable to connect to the network.

In some examples, the advertisement 114 is a Bluetooth Low Energy (BLE) advertisement message, and the method 800 includes determining, by the secondary device 108 an RSSI associated with the BLE advertisement message, and send an indication of the RSSI to the connectivity system 118.

At 808, the first device may receive, from at least one of the first remote server or a second remote server, a third message including an instruction that the first device establish a first communication link with the second device using the PAN protocol. For instance, the secondary device 108 may receive a request from the remote connectivity system 118 and/or the remote communication system 120 including an instruction that the secondary device 108 establish a first connection with the user device 106 using the BLE protocol.

At 810, the first device may establish the first communication link with the second device and using the PAN protocol. For instance, the secondary device 108 may use a BLE protocol to establish a first connection with the user device 106.

At 812, the first device may establish a second communication link, at least partly using an Internet Protocol (IP), with a second remote server. For instance, the secondary device 108 may establish a second connection, using TCP/IP for instance, between the secondary device 108 and the remote communication system 120.

At 814, the first device may receive an IP data packet from the second remote server using the second communication link. As an example, the secondary device 108 may receive an IP data packet from the remote communication system 120 using the second connection (TCP/IP).

At 816, the first device may send the IP data packet to the first device over the first communication link using the PAN protocol. For instance, the secondary device 108 may send the IP data packet to the user device 106 using IPv6 over BLE.

In some instances, receiving the IP data packet from the diagnostic device comprises creating an incoming transport control protocol (TCP) socket associated with the IP data packet, and sending the IP data packet to the first device comprises creating an outbound TCP socket associated with the IP data packet.

In some examples, the method 800 may further include, at least partly using the first connection and the second connection, communicating data by the secondary device 108 and between the user device 106 and the diagnostic device 120 according to a handshake for a secure communication protocol (e.g., TLS) such that a secure communication channel is established between the first device and the diagnostic device.

Figure 9:
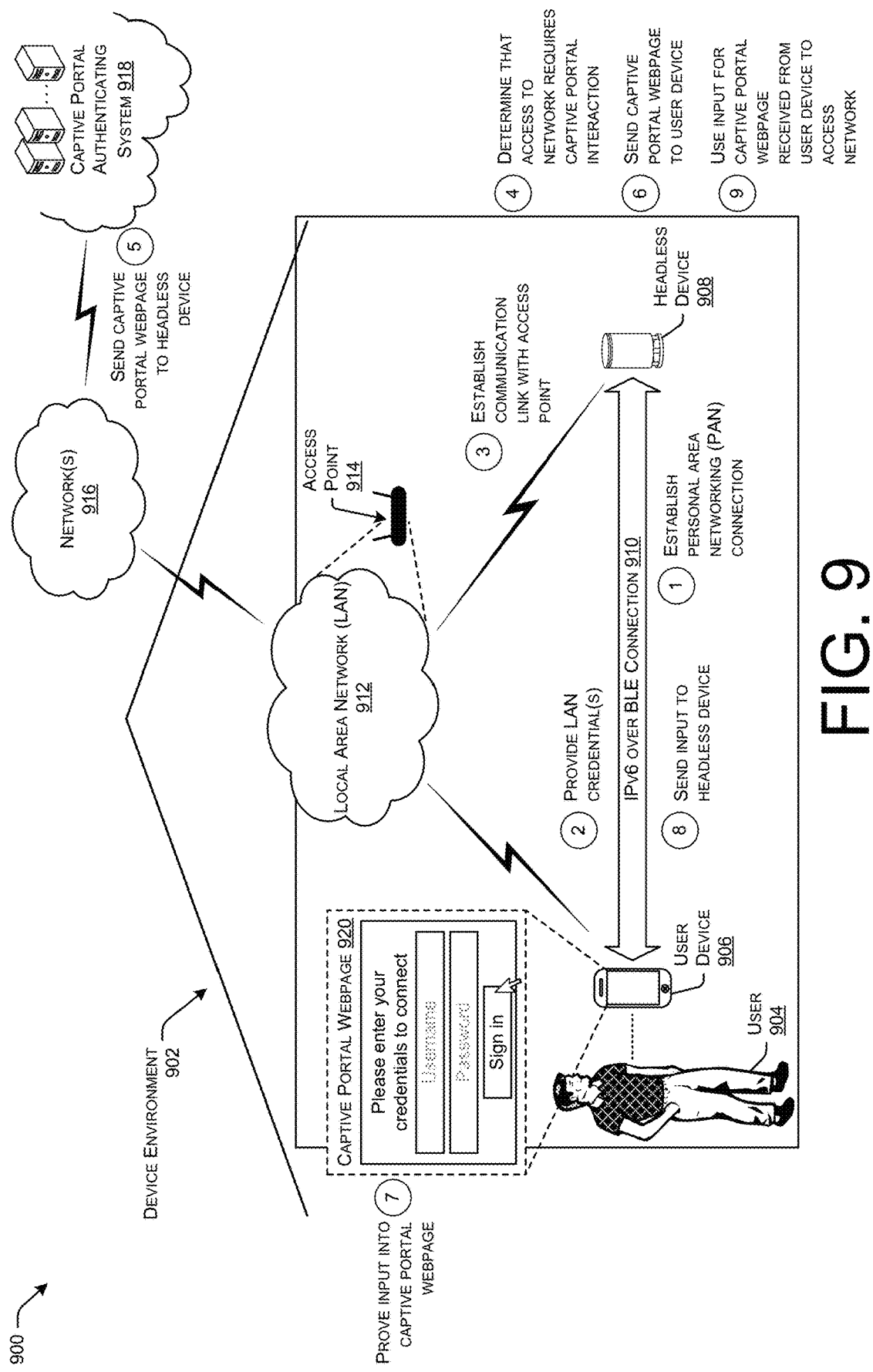
FIG. 9 illustrates an example environment in which a headless device determines that interaction with a captive portal is required to connect to a network. The headless device then connects to a user device using a PAN protocol, relays the captive portal webpage to the user device to allow the user to interact with the captive portal webpage, and relays the interaction from the user device to an access point for the network.

FIG. 9 illustrates an example environment 900 in which a headless device determines that interaction with a captive portal is required to connect to a network. The headless device then connects to a user device using a PAN protocol, relays the captive portal webpage to the user device to allow the user to interact with the captive portal webpage, and relays the interaction from the user device to an access point for the network.

As illustrated, the example environment 900 may include a device environment 902 that includes a user 904, a user device 906, and a headless device 908. The user device 906 and the headless device 908 may each comprise any sort of client computing device capable of communicating using one or more communication protocols and/or over one or more networks, such as voice-controlled assistants, tablet computing devices, smart televisions (TVs), laptop computer, desktop computers, mobile phones, display devices, audio devices, gaming devices, and/or the like. Generally, the user device 906 may include a display to present a captive portal webpage, and the headless device 908 may comprise a device that does not include a display or other means to output a captive portal webpage (e.g., smart assistant device that users 904 interact with through speech).

As illustrated, the device environment may further include an access point 914 that provides a local area network (LAN) 912. The LAN 912 may comprise any type of LAN, including any combination of wired and/or wireless LANs (e.g., WLANS), such as campus area networks (CANs), metropolitan area networks (MANs), etc. In some instances, the LAN 912 may comprise a network that follows an IEEE 802.11 standard, or a "WiFi" network. The access point 914 may provide devices that connect to the LAN 912 with access to one or more networks 916, such as the Internet.

At "1," the headless device 908 may establish a personal area networking (PAN) connection with the user device 906. In some instances, the headless device 908 may begin broadcasting advertisement messages upon being powered on, and/or upon determining that the headless device 908 does not have connectivity to the LAN 912. In some instances, the advertisement message may be a BLE message, and the headless device 908 and user device 906 may establish a BLE connection at "1." In some instances, the user device 906 may determine that the headless device 908 is attempting to connect to the LAN 912. The user device 906 may then, at "2," provide LAN credentials to the headless device 908 using IPv6 over BLE. The LAN credentials may include an indication of the LAN network 912 (e.g., S SID), and a password to provide to the access point 914 to access the LAN 912. The headless device 908 may then, at "3," provide the credentials to the access point 914 to access the LAN. Thus, the headless device 908 may establish a communication link with the access point 914, such as a Wi-Fi connection.

At "4," the headless device 908 may determine that access to the network 916 requires interaction with a captive portal webpage. For instance, the headless device 908 may be configured to send an HTTP request to a specific URL, and determine whether the URL returns a well-known result (e.g., status code). However, the URL may not return a well-known result, such as a different status code, and determine that the access point 914 requires interaction with a captive portal webpage before accessing the LAN 912.

At "5," a captive portal authenticating system 918 may generate and send the captive portal webpage to the headless device 908 over the network(s) 916. In some instances, the webpage of the captive portal may be stored locally at the access point 914 and transmitted to devices that are not on a whitelist of the access point 914 (e.g., have not correctly interacted with the captive portal webpage). However, in some examples, the captive portal webpage may reside in cloud-based captive portal authenticating system 918. For instance, the headless device 908 may interact with the captive portal authenticating system 918 to obtain or interact with the captive portal webpage 920.

At "6," the headless device 908 may receive the captive portal webpage from the access point 914, and send the captive portal webpage to the user device 906 using the IPv6 over BLE connection 910 via one or more IPv6 packets.

At "7," the user device 906 may present the captive portal webpage 920 on a display of the user device 906. The captive portal webpage 902 may prompt the user 904 to interact with the webpage 920, such as by presenting credentials. However, any type of captive portal webpage 920 may be utilized. The user 904 may then use any type of input (e.g., mouse, keyboard, touch screen, voice input, etc.) to interact with the captive portal webpage 902 as requested.

The user device 906 may then generate input data representing the interaction performed by the user 904 (e.g., credentials or other input).

At "8," the user device 906 may send the input data to the headless device 908 using the IPv6 over BLE connection 910 where the input data represents the interaction taken by the user 904. The input data may be sent in a payload of one of more IPv6 packets. At "9," the headless device may use the input data for the captive portal webpage received from the user device 904 to access the network 916. For instance, the headless device 908 may provide the access point 914 with the input data representing the interaction made by the user 904 via the user device 906 with the captive portal webpage 920. The access point 914 may then add an address of the headless device 908 (e.g., MAC address, IP address, etc.) to a whitelist of devices that are granted access to the network 916.

Figure 10:
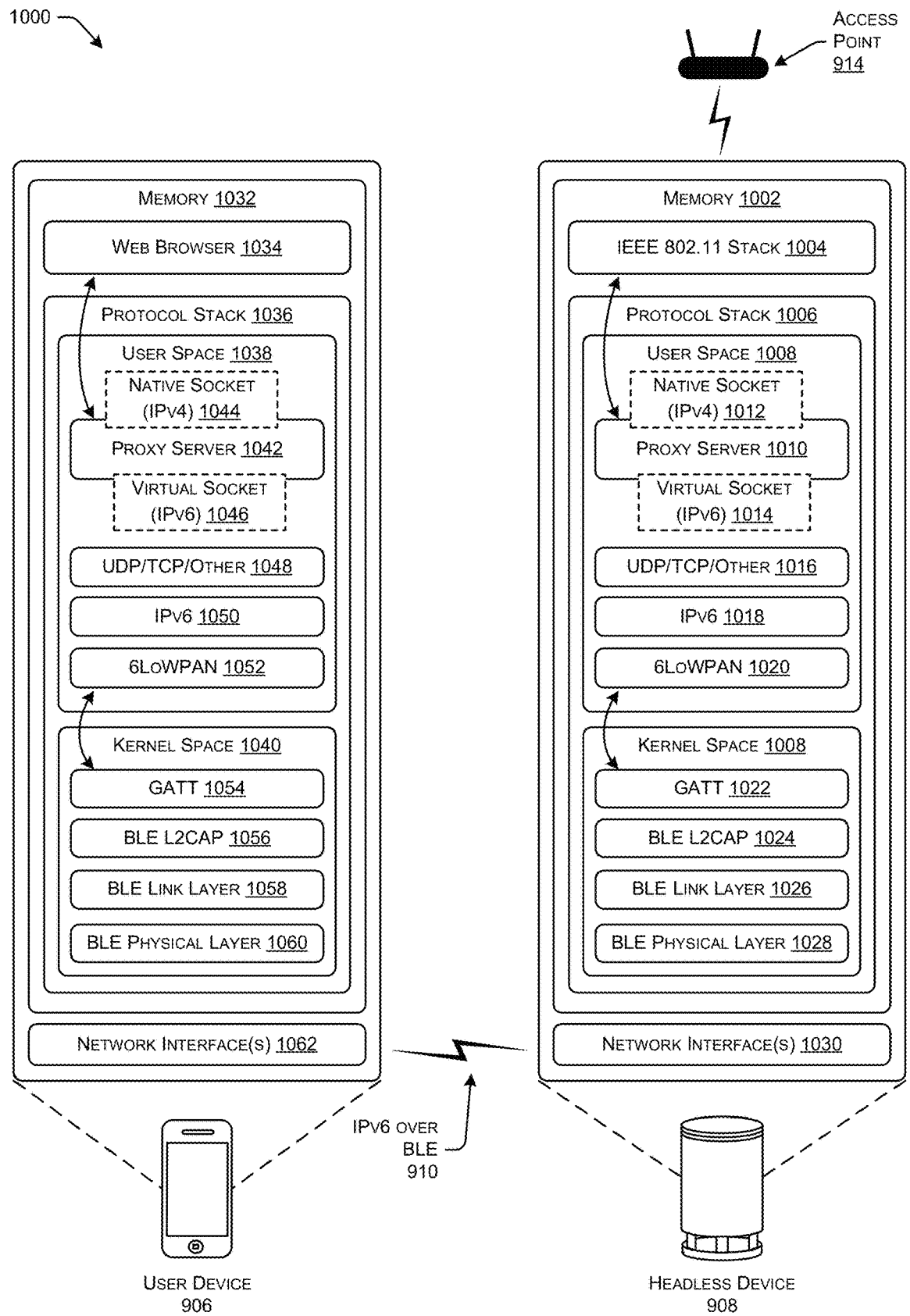
FIG. 10 illustrates example components of the user device and headless device of FIG. 9.

FIG. 10 illustrates example components of the user device 906 and headless device 908 of FIG. 9. The user device 906 may correspond to the user device 106 described in FIG. 4 and include any components of the user device 106 in FIG. 4. Generally, the user device 906 may comprise any type of user device 106, such as voice-controlled assistants, tablet computing devices, smart televisions (TVs), laptop computer, desktop computers, mobile phones, display devices, audio devices, gaming devices, and/or the like. The headless device 908 may be a device that does not have a monitor or display and input mechanisms (such as mouse, keyboard, etc.) for users to input network credentials and/or interact with captive portals. Thus, a 104 user of a headless device 908 may be unable to connect the headless device to networks that require interactions with a captive portal to enter network credential information.

The headless device 908 may include one or more processors (not illustrated), one or more network interfaces 1030, and one or more power supplies. The processors may include a central processing unit (CPU) for processing data and computer-readable instructions, and the network interfaces 1030 may enable the user device 106 to communicate with other devices and may be a radio, network interface card (NIC), software components, and/or any other hardware, software, or any combination thereof to enable the headless device 908 to communicate over various networks and using various protocols.

Further, the headless device 908 may include memory 1002 and may store or include computer-readable instructions that are executable on the processor(s). The memory 1002 may individually include volatile random access memory (RAM), non-volatile read only memory (ROM), non-volatile magnetoresistive (MRAM) and/or other types of memory. As illustrated, the memory 1002.

Further, the memory 410 may store an operating system 416 that includes software that supports a computer's basic functions, such as scheduling tasks, executing applications, controlling peripherals, etc. Further, the memory 410 may store a communication component that performs the communications described herein. For instance, the communication component may enable the headless device 908 to communicate, using the network interface(s) 1030, with other devices, such as the user device 906.

As shown, the memory 1002 may further store a protocol stack 1006 that enables the headless device 908 to communicate using various networking protocols. As illustrated, the protocol stack 1006 may have a portion stored in user space 1008 of the memory 1002, and kernel space 1008 of the memory 1002. Generally, the memory 1002 (e.g., RAM) of the user device 106 may include the user space 1008 and the kernel space 1008. Generally, the user space 1008 may include a set of locations where processes or application runs that generally do not have privilege or access to the kernel space 1008. The user space 1008 and kernel space 1008 may be virtually segregated portions of the memory 1002. In some examples, the kernel space 1008 is strictly reserved for running a privileged kernel of an operating system, including kernel extensions and most device drivers. In contrast, user space is the memory area where software such as applications, and some drivers, execute that do not have privileges to the kernel space 1008. The memory 1002 may store an IEEE 802.11 stack 1004 that configures the headless device 908 to communicate using any IEEE 802.11 protocol.

As noted above, the headless device 908 may communicate using TCP/IPv6 over BLE 910. For example, the Bluetooth SIG has developed RFC 7668 to support IPv6 over BLE. The use of IPv6 over BLE adds Low-power Wireless Personal Area Networks (6LoWPAN) on top of the Logical link control and adaptation protocol (L2CAP) protocol layer of the BLE protocol stack. The L2CAP protocol layer simplifier the IP headers, compresses data, and encapsulates the IP data packets to allow them to be sent via BLE. However, this implementation may require that the TCP/IP stack and the 6LowPAN stack be in the kernel space 1008.

Accordingly, the user space 1008 of the memory 1002 may store a portion of the protocol stack 1006 including, for example, a UDP/TCP/other 1016 protocol stack, an IPv6 1018 protocol stack, and a 6LowPAN 1020 protocol stack. Certain types of headless devices 908 may not grant privilege for applications or software to change the devices' TCP/IP configurations, which are traditionally in the kernel space 1008. Accordingly, by moving the TCP, IP, 6LoWPAN protocol stacks 1016, 1018, and 1020 into the user space 1008 of the user devices 106, the devices can redirect any 6LoWPAN input/output to a BLE Generic Attribute Profile (GATT) service and establish an end-to-end tunnel using applications or other software running on the user devices and secondary devices.

However, in some instances the entire protocol stack 1006 may be stored in the kernel space 1008 (traditional implementation). In such examples, the user device 106 may include or utilize a protocol stack 1006 as defined by RFC 7668 to support IPv6 over BLE, where the protocol stack 1006 is stored in the kernel space 1008.

However as noted above, in some instances at least a portion of the protocol stack 430 may be stored in user space memory 1008 of the user device 106. In such examples, the protocol stack 1006 may further include a 6LoWPAN-to-GATT mapping component, which may be a driver or other program that sits on top of the GATT profile 1022. That is, the 6LoWPAN-to-GATT mapping component may map inputs and outputs between the 6LoWPAN stack 1020 and the GATT stack 1022 that is in the kernel space 1008.

Further, as illustrated, the kernel space 1008 may store and operate the GATT stack 1022, a BLE L2CAP protocol stack 1024, a BLE link layer stack 1026, and a BLE physical layer stack 1028. In this way, the user space 1008 includes portions of the protocol stack 1006 that are needed to perform the techniques of this invention and are accessible and usable by the communication component to perform the communications described herein. For instance, the headless device 908 is configured to communicate with the user device 906 using the protocol stack 1006 according to IPv6 over BLE 910. The 6LoWPAN-to-GATT mapping component may generally input and output connections to a standard GATT 1022 of a BLE Tx/Rx interface. Accordingly, the 6LoWPAN-to-GATT mapping component may generally be a modification to the RFC 7668 by including the 6LoWPAN-to-GATT mapping component, and by having portions of the protocol stack 1006 stored in the user space 1008 and portions of the protocol stack 1006 stored in the kernel space 1008 as described herein.

As illustrate, the protocol stack 1006 may include a proxy server 1010 (e.g., socket proxy server such as Socks5) that may have native socket (IPv4) 1012 and a virtual socket (IPv6) 1014. The proxy server 1010 may translate IPv4 packets into IPv6 packets in order to send the IPv6 packets over the BLE connection 910.

Although the protocol stack 1006 is illustrated as having components in the user space 1008, such as the UDP/IP/other 1016, the IPv6 stack 1018, and the 6LoWPAN stack 1020, in some instances one or more of those components may be in the kernel space 1008. In such examples, the proxy server 1010 may have a native IPv6 socket if the headless device 908 supports it.

As shown, the user device 906 may similarly include memory 1032 that includes components similar to those of the headless device 908, such as a protocol stack 1036 that includes user space memory 1038 and kernel space memory 1040. The user space 1038 may store a proxy server 1042 that has a native socket (IPv4) 1044 and a virtual socket (IPv6) 1046, a UDP/TCP/other stack 1048, an IPv6 stack 1050, and a 6LoWPAN stack 1052. Further, the kernel space 1040 may include a GATT stack 1054, a BLE L2CAP stack 1056, a BLE link layer stack 1058, and a BLE physical layer 1060. The user device 906 may further store a web browser 1034 that is configured to present web pages, such as captive portal web pages.

Thus, the user device 906 may receive, using IPv6 over BLE 910, one or more IPv6 packets representing a captive portal web page. The protocol stack 1036 may be configured to receive the IPv6 packets, and the proxy server 1042 may use the virtual socket 1046 and the native socket 1044 to translate the IPv6 packets into IPv4 packets for consumption by the web browser 1034. The web browser 1034 may present the web page of the captive portal on a display of the user device 906, and the user 104 may provide input or otherwise interact with the web page of the captive portal. The web browser 1034 may then generate data packets that represent the interaction with the web page. The data packets may then be transmitted, using the network interfaces 1062 and the protocol stack 1036, as IPv6 packets over BLE 910 to the headless device 908. The headless device 908 may then proxy the data packets to the access point 914 using the protocol stack 1006, IEEE 802.11 stack 1004, and the network interfaces 1030. The user device 906 may then be able to access the network 916 in instances where the interaction with the captive portal webpage 920 grants access to the network 916.

FIGS. 11A, 11B, 12, and 13 illustrate flow diagrams of an example processes 1100, 1200, and 1300 for performing the techniques described herein. The processes 1100, 1200, and 1300, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Figure 11A:
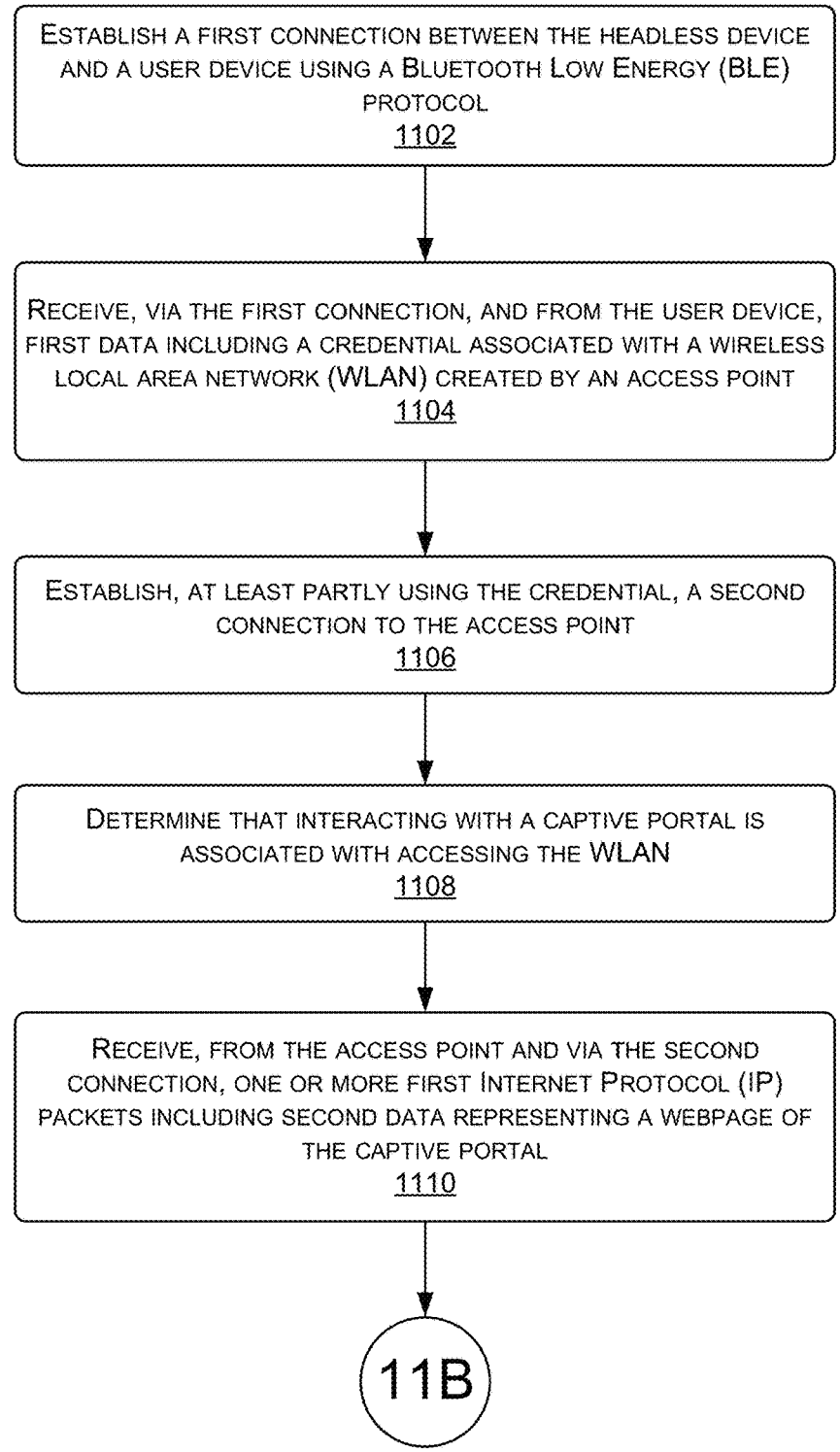
FIGS. 11A and 11B collectively illustrate an example method for a headless device to establish a connection with a user device using a BLE protocol. The headless device determines that interaction with a captive portal webpage is required to access a network created by an access point. The headless device then relays the webpage received from the access point to the user device using IPv6 over BLE. A user of the user device can then interact with the captive portal and send back the interaction to the headless device to enable the headless device to be placed on a whitelist of the access point for access to the network.
Figure 11B:
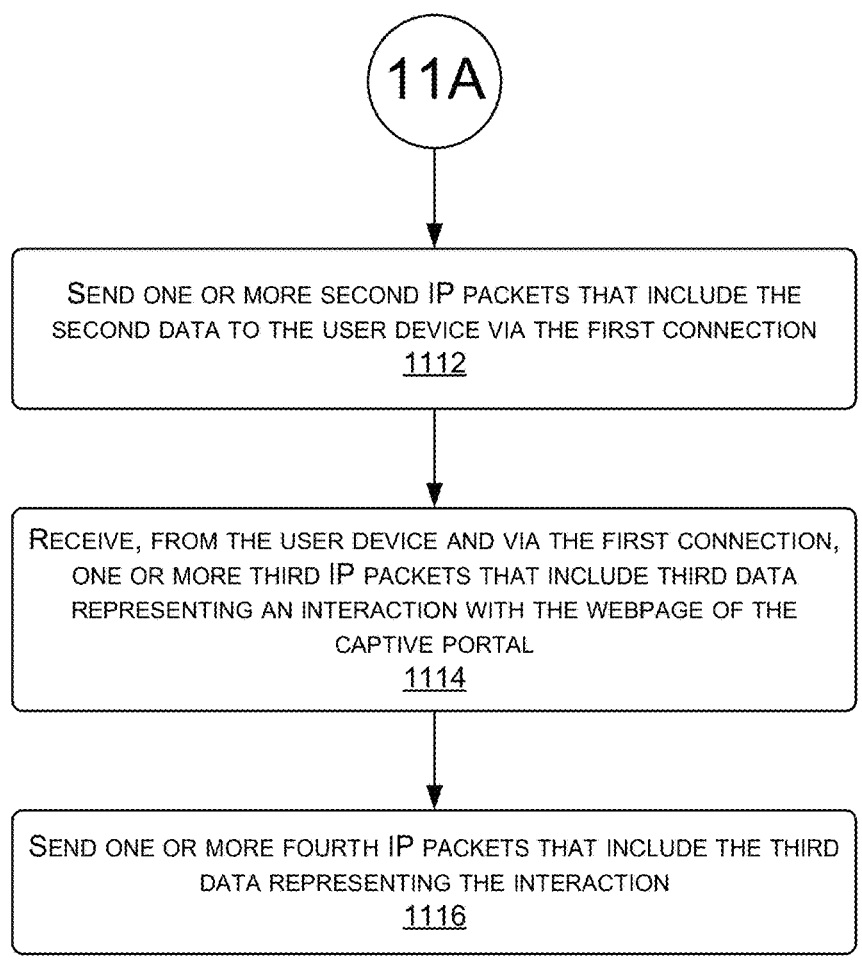

FIGS. 11A and 11B collectively illustrate an example method 1100 for a headless device to establish a connection with a user device using a BLE protocol. The headless device determines that interaction with a captive portal webpage is required to access a network created by an access point. The headless device then relays the webpage received from the access point to the user device using IPv6 over BLE. A user of the user device can then interact with the captive portal and send back the interaction to the headless device to enable the headless device to be placed on a whitelist of the access point for access to the network.

At 1102, the headless device may establish a first connection with a user device using a Bluetooth Low Energy (BLE) protocol. For instance, the headless device 908 may broadcast a BLE advertisement message, and go through the BLE handshake process with the user device 906.

At 1104, the headless device may receive via the first connection, and from the user device, first data including a credential associated with a wireless local area network (WLAN) created by an access point. For instance, the headless device 908 may receive credentials (e.g., SSID, password, etc.) to access the LAN 912 from the user device 906 in first data to provide to the access point 914.

At 1106, the headless device may establish, at least partly using the credential, a second connection to the access point. For instance, the headless device 906 may provide the password to the access point 914 in order to establish a Wi-Fi connection with the LAN 912. However, the headless device 906 may not have full access to the LAN 912.

At 1108, the headless device may determine that interacting with a captive portal is associated with accessing the WLAN. For instance, the headless device 908 may be configured to send an HTTP request to a specific URL, and determine whether the URL returns a well-known result (e.g., status code). However, the URL may not return a well-known result, such as a different status code, and determine that the access point 914 requires interaction with a captive portal webpage before accessing the LAN 912.

At 1110, the headless device may receive, from the access point and via the second connection, one or more first Internet Protocol (IP) packets including second data representing a webpage of the captive portal. For instance, the access point 914 may relate data representing the captive portal webpage 920 to the headless device 908 using IPv4 over the Wi-Fi connection.

At 1112, the headless device may send one or more second IP packets that include the second data to the user device via the first connection. For instance, the headless device 908 may send one or more IPv6 packets over the BLE connection 910 to the user device 906 where the IPv6 packets include the data representing the captive portal webpage 920.

At 1114, the headless device may receive, from the user device and via the first connection, one or more third IP packets that include third data representing an interaction with the webpage of the captive portal. For instance, the user device 906 may have returned data representing an interaction taken by the user 904 with the captive portal webpage 920 (e.g., additional credentials, push of a button, etc.). The third data may be sent in one or more IPv6 packets to the headless device 908.

At 1116, the headless device may send one or more fourth IP packets that include the third data representing the interaction. For instance, the headless device 908 may send one or more IPv4 packets to the access point 912 where the IPv4 packets represent the interaction (e.g., include credentials) with the captive portal webpage 920. The access point 914 may then place the headless device 908 on a whitelist and allow the headless device 908 to access the LAN 912.

Figure 12:
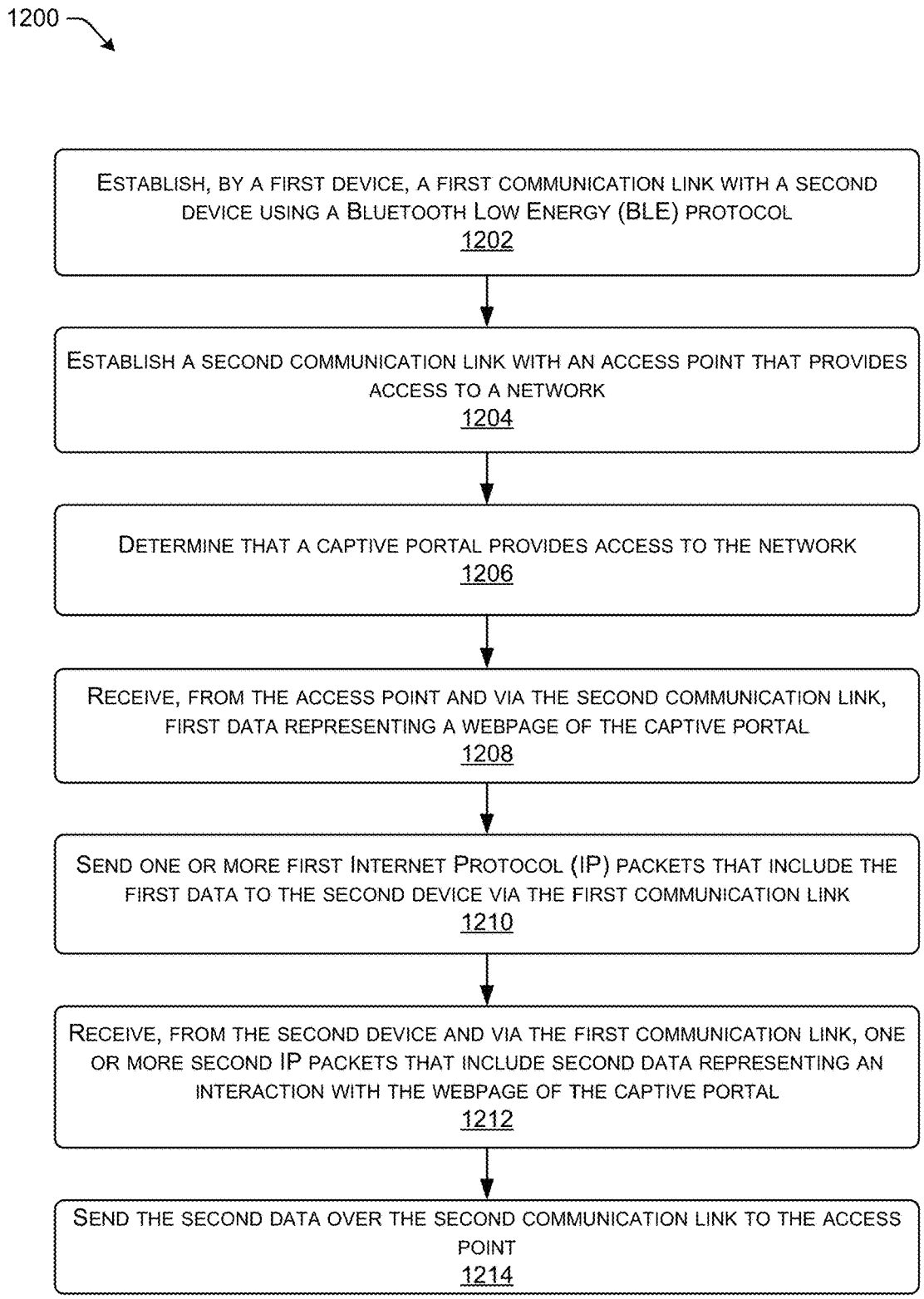
FIG. 12 illustrates another example method for a headless device to establish a connection to a user device using a PAN protocol, and serve as a proxy or middle-man for the user device to interact with a captive portal for access to a network created by an access point. The captive portal and resulting input data are sent back and forth between the headless device and user device using the PAN protocol, and the user of the user device is able to connect the headless device to the network in this way.

FIG. 12 illustrates another example method 1200 for a headless device to establish a connection to a user device using a PAN protocol, and serve as a proxy or middle-man for the user device to interact with a captive portal for access to a network created by an access point. The captive portal and resulting input data are sent back and forth between the headless device and user device using the PAN protocol, and the user of the user device is able to connect the headless device to the network in this way.

At 1202, the first device may establish a first communication link with a second device using a personal area networking (PAN) protocol, such as Bluetooth Low Energy (BLE) protocol. For instance, the headless device 908 may establish a BLE connection 910 with the user device 906 to communicate IPv6 packets over the BLE connection 910.

At 1204, the first device may establish a second communication link with an access point that is associated with access to a network. As an example, the headless device 908 may receive a credential (e.g., SSID, password, etc.) from the user device 906 over the BLE connection 910, and use the credential(s) to establish a WiFi connection with the access point 914.

At 1206, the first device may determine that a captive portal is associated with accessing the network. For instance, the headless device 908 may send third data including a Hypertext Transfer Protocol (HTTP) request comprising a uniform resource locator (URL) to the access point 914 and via the second communication link (e.g., WiFi) where the HTTP request associated with eliciting a first HTTP response status code (e.g., an expected response). The headless device 908 may then receive fourth data including a second HTTP response status code from the access point 914 and via the second communication link, and determine that the second HTTP response status code is different than the first HTTP response status code. Thus, the HTTP response is different than expected for the HTTP request. In such examples, based at least in part on the second HTTP response status code being different than the first HTTP response status code, the headless device 908 may determine that the captive portal is associated with accessing the network 916.

At 1208, the first device may receive, from the access point and via the second communication link, first data representing a webpage of the captive portal. For instance, the headless device 908 may receive one or more IPv4 packets representing the captive portal webpage 920 from the access point 914 and over the WiFi connection.

At 1210, the first device may send one or more first Internet Protocol (IP) packets that include the first data to the second device via the first communication link. For instance, the proxy server 1010 may translate the IPv4 packets into IPv6 packets that are transmitted to the user device 906 over the BLE connection 910.

At 1212, the first device may receive, from the second device and via the first communication link, one or more second IP packets that include second data representing an interaction with the webpage of the captive portal. For instance, the headless device 908 may receive one or more IPv6 packets from the user device 906 and over the BLE connection 910 where the IPv6 packets include an interaction made by a user 904 with the captive portal webpage 920 (e.g., input such as username and password, click of an input button, etc.).

At 1214, the first device may send the second data over the second communication link to the access point. For instance, the headless device 908 may send one or more IPv4 packets over the WiFi link to the access point 914 that includes the interaction made by the user 904 with the captive portal webpage 920. In some examples, the headless device 908 may then be granted access to the network(s) 916 via the access point 914.

Figure 13:
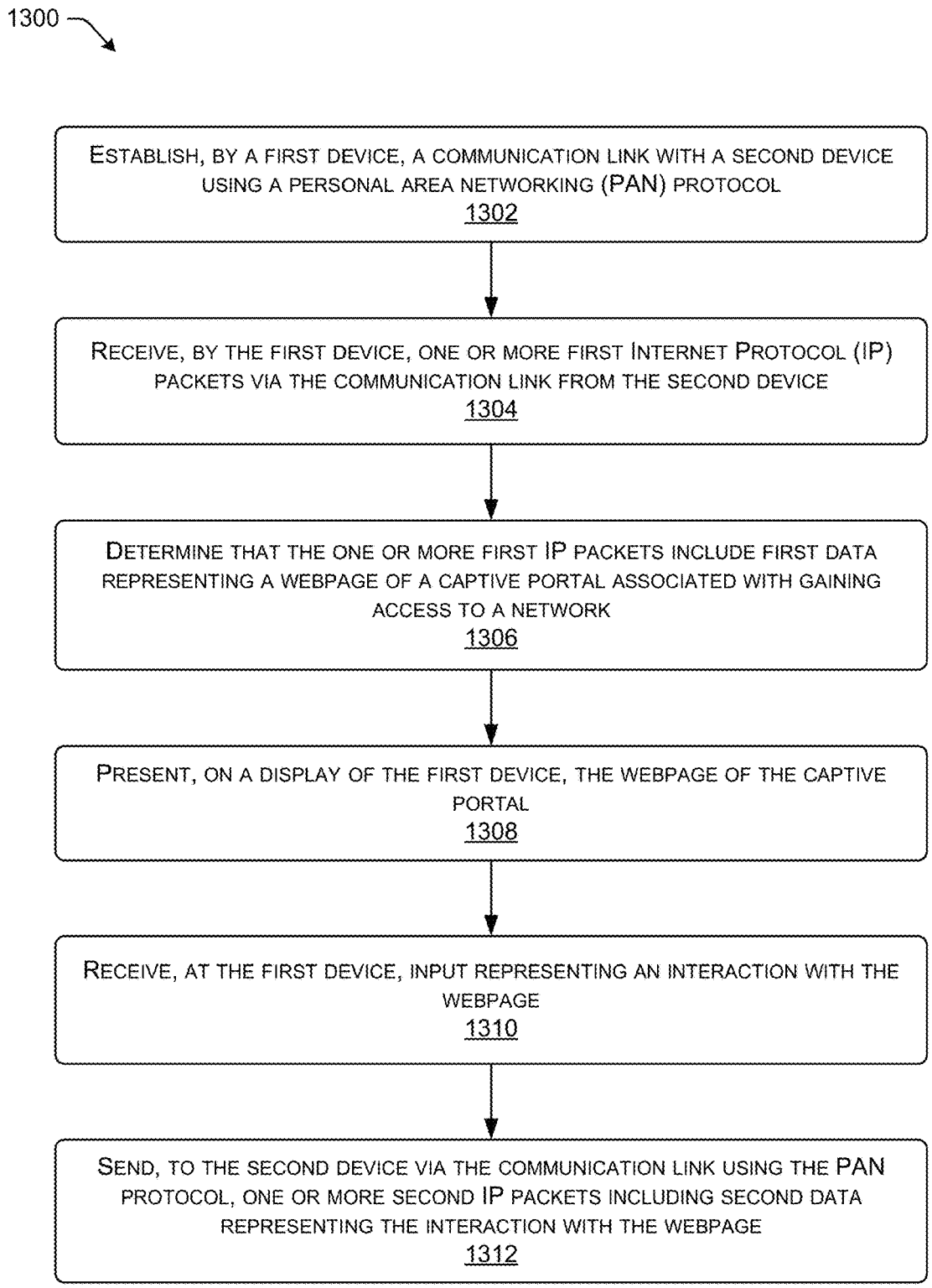
FIG. 13 illustrates an example method for a user device to communication with a headless device using a PAN protocol such that a user of the user device can interact with a captive portal on behalf of the headless device to provide the headless device with access to a network created by an access point.

FIG. 13 illustrates an example method 1300 for a user device to communication with a headless device using a PAN protocol such that a user of the user device can interact with a captive portal on behalf of the headless device to provide the headless device with access to a network created by an access point.

At 1302, the first device may establish a communication link with a second device using a personal area networking (PAN) protocol, such as a BLE protocol. For instance, the user device 906 and the headless device 908 may establish a BLE connection 910.

At 1304, the first device may receive one or more first Internet Protocol (IP) packets via the communication link from the second device. For example, the user device 906 may receive one or more IPv6 packets using the BLE connection 910.

At 1306, the first device may determine that the one or more first IP packets include first data representing a webpage of a captive portal associated with accessing a network. For instance, the user device 906 may determine that the one or more IPv6 packets represent the webpage of the captive portal that requires input and/or interaction by a user 904 in order to grant the headless device 908 access to the network 916.

At 1308, the first device may present, on a display of the first device, the webpage of the captive portal. For instance, the user device 906 may output the webpage of the captive portal 920 on a display of the user device 906, where the captive portal webpage 920 includes one or more fields, user interface elements, and/or other input mechanism by which the user 904 may interact or provide input (e.g., username and password for captive portal, clicking an agreement button, etc.).

At 1310, the first device may receive, at the first device, input representing an interaction with the webpage. For instance, the user device 906 may receive, via the captive portal webpage 920, input representing credentials (e.g., username and password), an agreement indication, and so forth.

At 1312, the first device may send, from the first device and to the second device via the communication link using the PAN protocol, one or more second IP packets including second data representing the interaction with the webpage. For example, the user device 106 may send one or more IPv6 packets over the BLE connection 910 to the headless device 908 to be forwarded to the access point 914 to provide the headless device 908 with access to the network 916.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a headless device, the method comprising:
   establishing a first connection between the headless device and a user device using a Bluetooth Low Energy (BLE) protocol;
   receiving, at the headless device, via the first connection, and from the user device, first data including a credential associated with a wireless local area network (WLAN) created by an access point;
   establishing, at least partly using the credential, a second connection to the access point;
   receiving, from the access point and via the second connection, one or more first Internet Protocol (IP) packets including second data representing a webpage of a captive portal associated with the access point, the webpage requesting an interaction in order to gain access to a network through the access point;
   sending, from the headless device to the user device, one or more second IP packets that include the second data;
   receiving, from the user device and via the first connection, one or more third IP packets that include third data representing the interaction with the webpage of the captive portal; and
   sending, from the headless device to the access point, one or more fourth IP packets that include the third data.

2. The method of claim 1, wherein sending the one or more second IP data packets comprises:
   sending the one or more second IP data packets using a portion of protocol stack stored in application space memory of the headless device, the portion of the protocol stack including:
   a transport control layer (TCP) protocol stack;
   an IP version 6 (IPv6) protocol stack; and
   an IPv6 and Low-power Wireless Personal Area Networks (6LoWPAN) protocol stack.

3. The method of claim 1, wherein the one or more first IP packets comprise one or more IP version 4 (IPv4) packets and the one or more second IP packets comprise one or more IP version 6 (IPv6) packets, the method further comprising:
   receiving, at a proxy server of the headless device, the one or more IPv4 packets;
   identifying, by the proxy server, the second data representing the webpage in a first payload of the one or more IPv4 packets; and
   generating, at least partly by the proxy server, the one or more IPv6 packets such that a second payload of the one or more IPv6 packets includes the second data.

4. A first device comprising:
   one or more processors; and
   one or more computer-readable media storing computer-executable instructions that, when executed by the one or more processors, cause the one or more processors to perform operations comprising:
   establishing a first communication link with a second device using a Bluetooth Low Energy (BLE) protocol;

establishing a second communication link with an access point that provides access to a network;

receiving, from the access point, first data representing a webpage of a captive portal associated with gaining access to the network;

sending, to the second device and using the BLE protocol, one or more first Internet Protocol (IP) packets that include the first data;

receiving, from the second device and using the BLE protocol, one or more second IP packets that include second data representing an interaction between the second device and the webpage of the captive portal; and sending the second data to the access point.

5. The first device of claim 4, wherein the one or more first IP data packets comprise one or more IP version 6 (IPv6) data packets received over the BLE protocol.

6. The first device of claim 4, wherein the first data is received in one or more IP version 4 (IPv4) packets and the one or more first IP packets comprise one or more IP version 6 (IPv6) packets, the operations further comprising:

receiving, at a proxy server of the first device, the one or more IPv4 packets;

identifying, by the proxy server, the first data representing the webpage in a first payload of the one or more IPv4 packets; and generating, at least partly by the proxy server, the one or more IPv6 packets such that a second payload of the one or more IPv6 packets include the first data representing the webpage.

7. The first device of claim 4, the operations further comprising, prior to receiving the first data;

receiving, from the second device, third data representing a credential associated with accessing the network, wherein establishing the second communication link with the access point is performed at least partly using the credential.

8. The first device of claim 4, the operations further comprising:

sending third data including a Hypertext Transfer Protocol (HTTP) request comprising a uniform resource locator (URL) to the access point and via the second communication link, the HTTP request associated with eliciting a first HTTP response status code;

receiving fourth data including a second HTTP response status code from the access point and via the second communication link;

determining that the second HTTP response status code is different than the first HTTP response status code; and based at least in part on the second HTTP response status code being different than the first HTTP response status code, determining that the captive portal is associated with accessing the network.

9. The first device of claim 4, wherein sending the one or more first IP data packets comprises:

sending the one or more first IP data packets using a portion of protocol stack stored in application space memory of the first device, the portion of the protocol stack including:

a transport control layer (TCP) protocol stack;

an IP version 6 (IPv6) protocol stack; and an IPv6 and Low-power Wireless Personal Area Networks (6LoWPAN) protocol stack.

10. The first device of claim 9, wherein:

the portion of the protocol stack further comprises a software component configured to map the 6LoWPAN protocol stack to a Generic Attribute Profile (GATT) stored in kernel space of the memory of the first device.

11. The first device of claim 4, wherein the first data is received in one or more IP version 4 (IPv4) packets and the one or more first IP packets comprise one or more IP version 6 (IPv6) packets, the operations further comprising:

receiving, at a proxy server of the first device, the one or more IPv4 packets;

generating, at least partly by the proxy server, one or more IPv6 packets that include a payload of the one or more IPv4 packets comprising the first data representing the webpage;

sending the one or more first IP data packets using a portion of protocol stack stored in kernel space memory of the first device, the portion of the protocol stack including:

a transport control layer (TCP) protocol stack;

an IP version 6 (IPv6) protocol stack; and an IPv6 and Low-power Wireless Personal Area Networks (6LoWPAN) protocol stack.

12. The first device of claim 4, wherein the first data is received in one or more IP version 4 (IPv4) packets and the one or more first IP packets comprise one or more IP version 6 (IPv6) packets, the operations further comprising:

receiving the one or more IPv4 packets;

identifying the first data representing the webpage in a first payload of the one or more IPv4 packets; and generating the one or more IPv6 packets such that a second payload of the one or more IPv6 packets include the first data representing the webpage.

13. A method comprising:

establishing, by a first device, a communication link with a second device using a Bluetooth Low Energy (BLE) protocol;

receiving, by the first device, one or more first Internet Protocol (IP) packets via the communication link from the second device;

determining that the one or more first IP packets include first data representing a webpage of a captive portal associated with gaining access to a network;

presenting, on a display of the first device, the webpage of the captive portal;

receiving, at the first device, input representing an interaction with the webpage; and sending, from the first device and to the second device via the communication link using the BLE protocol, one or more second IP packets including second data representing the interaction with the webpage.

14. The method of claim 13, wherein sending the one or more second IP packets comprises sending one or more IP version 6 (IPv6) data packets over the BLE protocol.

15. The method of claim 14, wherein sending the one or more IPv6 data packets over the BLE protocol is performed at least partly using a portion of a protocol stack stored in user space of memory of the first device; and the portion of the protocol stack includes:

a transport control layer (TCP) protocol stack;

an IPv6 protocol stack; and an IPv6 and Low-power Wireless Personal Area Networks (6LoWPAN) protocol stack.

16. The method of claim 15, wherein:

the portion of the protocol stack further comprises a software component configured to map the 6LoWPAN protocol stack to a Generic Attribute Profile (GATT) stored in kernel space of the memory of the first device.

17. The method of claim 13, wherein the one or more first IP packets are one or more IP version 6 (IPv6) packets, further comprising:
- receiving, at a proxy server of the first device, the one or more IPv6 packets;
- identifying, by the proxy server, the first data representing the webpage in a first payload of the one or more IPv6 packets;
- generating, at least partly by the proxy server, one or more IPv4 packets such that a second payload of the one or more IPv4 packets include the first data representing the webpage; and
- providing, by the proxy server, the one or more IPv4 packets to a web browser of the first device.

18. The method of claim 13, wherein:
- sending the one or more IP data packets over the BLE protocol is performed at least partly using a portion of a protocol stack stored in user space of memory of the first device; and
- the portion of the protocol stack includes:
    - a transport control layer (TCP) protocol stack;
    - an IPv6 protocol stack; and
    - an IPv6 and Low-power Wireless Personal Area Networks (6LoWPAN) protocol stack.

19. The method of claim 13, further comprising, prior to receiving the one or more first IP packets:
- receiving, from the second device, third data including a request for a credential to connect to the network; and
- sending, to the second device, fourth data including the credential for connecting to the network.

20. The method of claim 13, wherein the one or more first IP packets are one or more IP version 6 (IPv6) packets, further comprising:
- receiving the one or more IPv6 packets;
- identifying the first data representing the webpage in a first payload of the one or more IPv6 packets;
- generating one or more IPv4 packets such that a second payload of the one or more IPv4 packets include the first data representing the webpage; and
- providing the one or more IPv4 packets to a web browser of the first device.

\* \* \* \* \*